(12) United States Patent
Österlund et al.

(10) Patent No.: US 11,573,894 B2
(45) Date of Patent: Feb. 7, 2023

(54) TRACKING GARBAGE COLLECTION STATES OF REFERENCES

(71) Applicant: Oracle International Corporation, Redwood Shores, CA (US)

(72) Inventors: Erik Österlund, Västerhaninge (SE); Per Liden, Stockholm (SE); Stefan Mats Rikard Karlsson, Nacka (SE)

(73) Assignee: Oracle International Corporation, Redwood Shores, CA (US)

( * ) Notice: Subject to any disclaimer, the term of this patent is extended or adjusted under 35 U.S.C. 154(b) by 278 days.

(21) Appl. No.: 17/084,053

(22) Filed: Oct. 29, 2020

(65) Prior Publication Data

US 2022/0138098 A1    May 5, 2022

(51) Int. Cl.
   *G06F 12/02*    (2006.01)
(52) U.S. Cl.
   CPC .... *G06F 12/0253* (2013.01); *G06F 2212/702* (2013.01); *G06F 2212/7205* (2013.01)
(58) Field of Classification Search
   CPC .......... G06F 12/0253; G06F 2212/702; G06F 2212/7205; G06F 2212/1016; G06F 12/0269
   See application file for complete search history.

(56) References Cited

U.S. PATENT DOCUMENTS

| | | | |
|---|---|---|---|
| 5,765,007 A | 6/1998 | Rahman et al. | |
| 5,873,104 A | 2/1999 | Tremblay et al. | |
| 5,928,357 A | 7/1999 | Underwood et al. | |
| 6,304,949 B1 | 10/2001 | Houlsdworth | |
| 6,769,004 B2 | 7/2004 | Barrett | |
| 7,089,272 B1 | 8/2006 | Garthwaite et al. | |
| 7,404,182 B1 * | 7/2008 | Garthwaite | G06F 12/0269 717/140 |

(Continued)

FOREIGN PATENT DOCUMENTS

WO     00/29937 A2    5/2000

OTHER PUBLICATIONS

Click et al.; "The Pauseless GC Algorithm", VEE 05, Jun. 11-12, 2005, Chicago, Illinois, USA. Copyright 2005 ACM 1-59593-047-7/05/0006 . . . S5.00.

(Continued)

*Primary Examiner* — Jared M Bibbee
(74) *Attorney, Agent, or Firm* — Invoke

(57) ABSTRACT

Garbage collection (GC) states are stored within references stored on a heap memory to track a progress of GC operations with respect to the references. GC state may be stored in a non-addressable portion of references. Based on the GC state of a particular reference, a set of GC operations are selected and performed for the reference. However, references stored on a call stack do not include any indication of GC state. Hence, loading a reference from heap to call stack involves removing the indication of GC state. Writing a reference to heap involves adding the indication of GC state. References embedded within a compiled method also do not indicate any GC state. Metadata of the compiled method indicate a GC state, which is implicated to the embedded references. GC operations are selected and performed for each embedded reference based on the GC state of the compiled method.

31 Claims, 21 Drawing Sheets

(56) References Cited

U.S. PATENT DOCUMENTS

| | | | |
|---|---|---|---|
| 7,546,587 | B2 | 6/2009 | Marr et al. |
| 9,208,081 | B1* | 12/2015 | Dice ................ G06F 12/0269 |
| 10,261,898 | B1* | 4/2019 | Payer ................ G06F 12/0269 |
| 10,996,884 | B2* | 5/2021 | Danilov ............... G06F 3/0608 |
| 2004/0186863 | A1 | 9/2004 | Garthwaite |
| 2004/0187102 | A1 | 9/2004 | Garthwaite |
| 2005/0235006 | A1 | 10/2005 | Adl-Tabatabai et al. |
| 2007/0022149 | A1* | 1/2007 | Bacon ................ G06F 12/0269 |
| 2010/0114998 | A1* | 5/2010 | Steensgaard ........ G06F 12/0269 707/813 |
| 2012/0203804 | A1* | 8/2012 | Burka ................ G06F 12/0269 707/820 |
| 2014/0310235 | A1 | 10/2014 | Chan et al. |
| 2015/0006843 | A1* | 1/2015 | Moser ................. G06F 12/023 711/170 |
| 2015/0081996 | A1 | 3/2015 | Flood |
| 2017/0344473 | A1* | 11/2017 | Gidra ................ G06F 12/0269 |
| 2019/0042406 | A1* | 2/2019 | Guniguntala ....... G06F 12/0253 |
| 2020/0081748 | A1 | 3/2020 | Johnson et al. |
| 2020/0125364 | A1 | 4/2020 | Osterlund |
| 2020/0310963 | A1 | 10/2020 | Nilsen |
| 2021/0278990 | A1* | 9/2021 | Choi ................. G06F 12/0246 |

OTHER PUBLICATIONS

David Gnedt, "Fast Profiling in the HotSpot Java VM with Incremental Stack Tracing and Partial Safepoints," Faculty of Engineering and Natural Sciences, 2014, 57 pages.

Domani et al., "Implementing an On-the-fly Garbage Collector for Java," ACM SIGPLAN Notices, vol. 36, No. 1, 2000, pp. 155-166.

Kliot et al., "A Lock-Free, Concurrent, and Incremental Stack Scanning for Garbage Collectors," In Proceedings of the ACM SIGPLAN/SIGOPS International Conference on Virtual Execution Environments (VEE '09), 2009, pp. 11-20.

Open JDK, "HotSpot Glossary of Terms", 2006, Sun Microsystems, available at <https://openjdk.java.net/groups/hotspot/docs/HotSpotGlossary.html>, 6 pages.

Osterlund et al., "Block-Free Concurrent GC: Stack Scanning and Copying," International Symposium on Memory Management, vol. 51, 2016, 12 pages.

Robbin Ehn, "JEP 312: Thread-Local Handshakes," Hotspot Dash Dev at Openjdk Dot Java Dot Net, available at <http://openjdk.java.net/jeps/312>, 2018, 3 pages.

Tene et al.; C4: The Continuously Concurrent Compacting Collector ISMM'11, Jun. 4-5, 2011, San Jose, CA, USA Copyright 2011, ACM 978-M503-0263-0/11/06 . . . $10.00.

Yuasa et al., "Return Barrier," International Lisp Conference, 2002, 12 pages.

Main—Main—OpenJDK Wiki, Created by Iris Clark, last modified by Per Liden, available online at <URL: https://wiki.openjdk.java.net/display/zgc/Main>, Oct. 15, 2020, 9 pages.

Per Liden, The Design of ZGC—A scalable Low-Latency Garbage Collector for Java: available online at <http://cr.openjdk.java.net/~pliden/slides/ZGC-PLMeetup-2019.pdf>, Jun. 12, 2019, 84 pages.

The Z Garbage Collector—Low Latency GC OpenJDK, available online at <http://cr.openjdk.java.net/~pliden/slides/ZGC-Jfokus-2018.pdf>, 2018, 96 pages.

Yang et al., "Improving Program Locality in the GC using Hotness," PLDI' 20, pp. 301-313, Jun. 15-20, 2020.

ZGC Concurrent Class Unloading—Another Safepoint Operation Bites the Dust: available online at <http://cr.openjdk.java.net/~pliden/slides/ZGC-Jfokus-2019.pdf>, Feb. 4, 2019, 55 pages.

A concurrent, generational garbage collector for a multithreaded implementation of ML by Doligez (Year: 1993).

A Hardware Accelerator for Tracing Garbage Collection by Maas (Year: 2018).

Generational Garbage Collection, Write Barriers/Write Protection and userfaultfd(2) by Cracauer (Year: 2016).

Getting started with Z Garbage Collector(ZGC) in Java 11 [Tutorial] by Davis (Year: 2019).

JEP 333: ZGC: A Scalable Low-Latency Garbage Collector(Experimental) by Liden and Karlsson (Year: 2020).

Mostly Concurrent Garbage Collection Revisited by Barabash (Year: 2003).

Write Barrier Elision for Concurrent Garbage Collectors by Vechev (Year: 2004).

"ZGC—Generations Revision 2", accessed at https://wiki.se.oracle.com/display/JPG/ZGC+-+Generations+Revision , Feb. 1, 2020, pp. 6.

Wilson, P.R., et al., "A "Card-making" scheme for controlling intergenerational differences in generation—based garbage collection on stock hardware," ACM SIGPLAN Notices, vol. 24, Issue 5, May 1989, pp. 87-92.

Yuasa, T., "Real-time garbage collection on general-purpose machines," Journal of Systems and Software, vol. 11, Issue 3, <arch 1990, pp. 181-198.

* cited by examiner

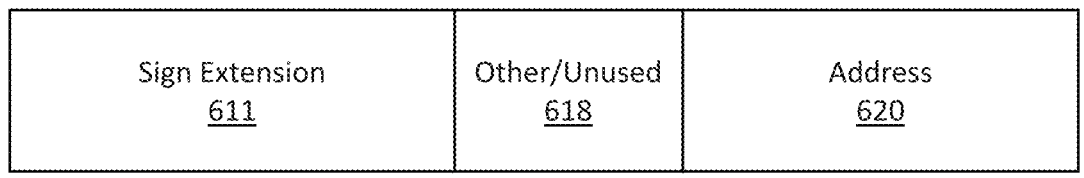
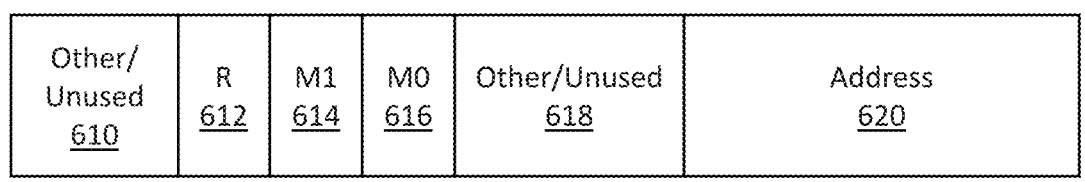
FIG. 6

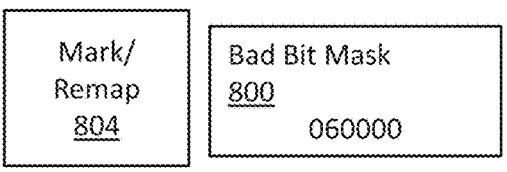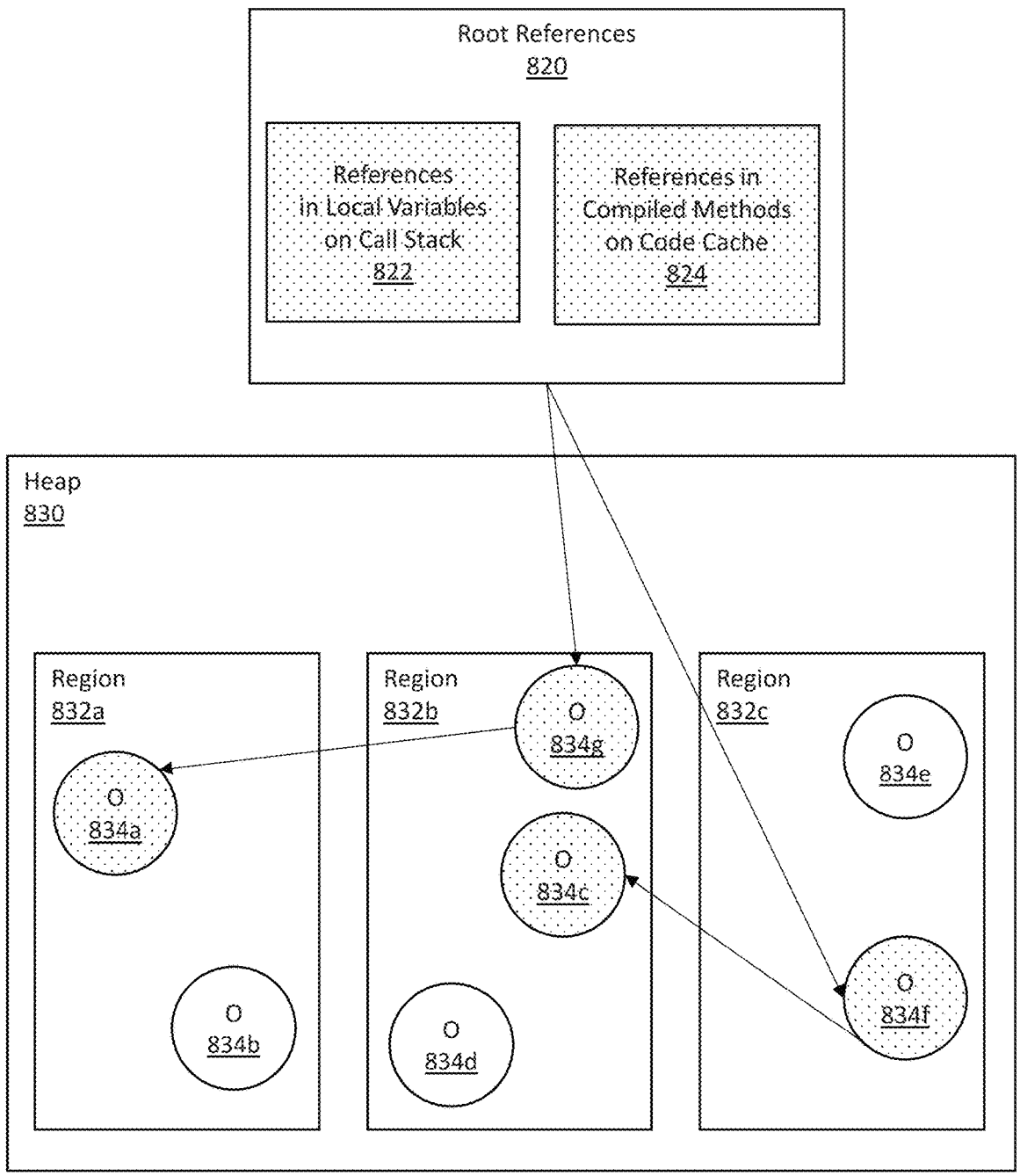
FIG. 8B

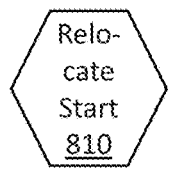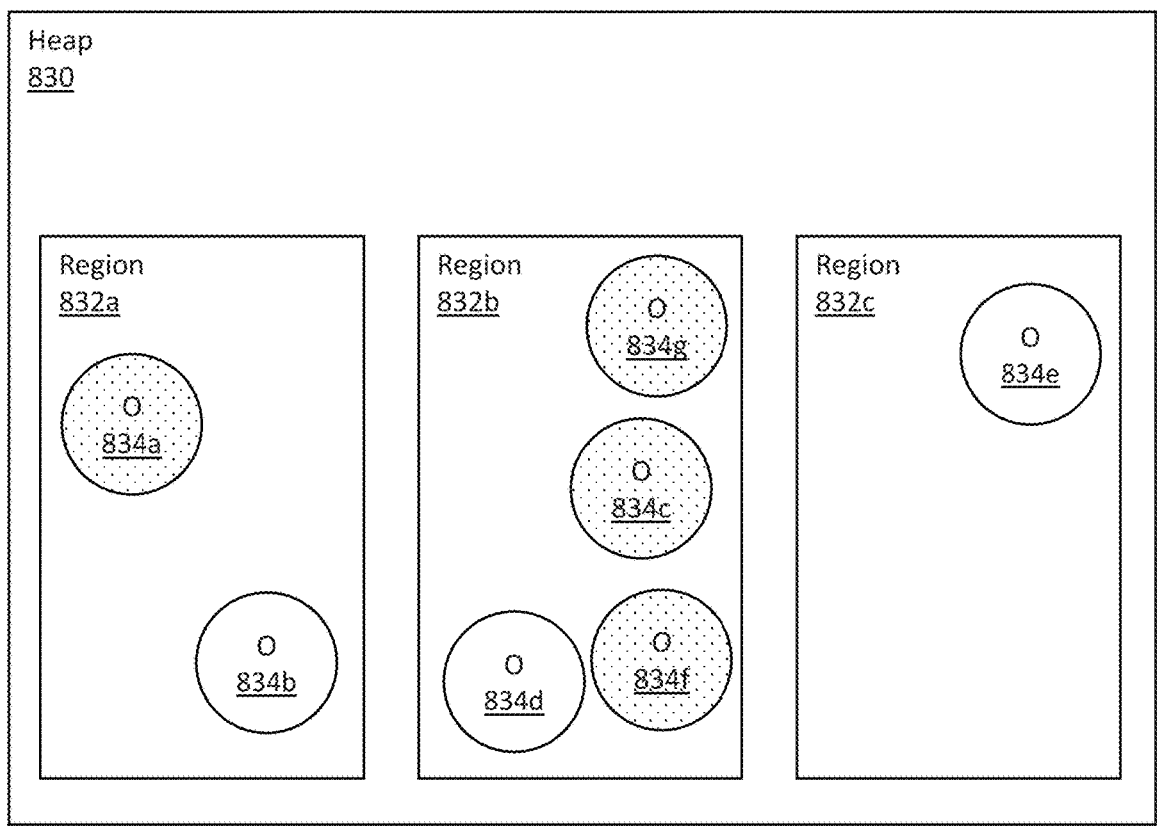
FIG. 8C

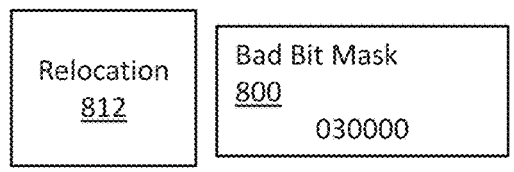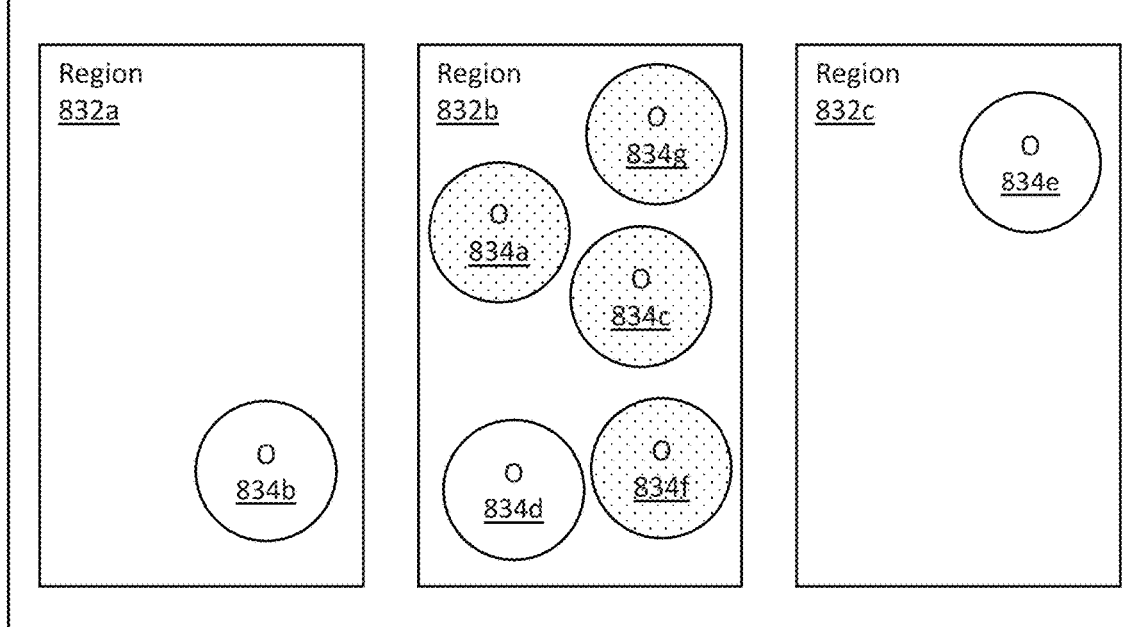
FIG. 8D

Marking a Heap Reference During M0/M1 Window by a GC thread:

Paths for Bringing a Heap Reference from a Current GC State to a Good GC State:

Table 1500 

| Current GC State \ Good GC State | Current Mark State | Remap State |
|---|---|---|
| Current Mark State | [None] | 1. Remap address<br>2. Update GC state of reference to remap state |
| Remap State | 1. Mark object as live<br>2. Update GC state of reference to current mark state | [None] |
| Old Mark State | 1. Remap address<br>2. Mark object as live<br>3. Update GC state of reference to current mark state | [N/A] |

Fig. 15

Writing a Heap Reference by an App Thread:

Paths for Bringing a Current GC State to a Good GC State:

Table 1800

| Current GC State \ Good GC State | Current Mark State | Remap State |
|---|---|---|
| Current Mark State | [None] | 1. Remap address |
| Remap State | 1. Mark object as live | [None] |
| Old Mark State | 1. Remap address<br>2. Mark object as live | [N/A] |

TRACKING GARBAGE COLLECTION STATES OF REFERENCES

RELATED APPLICATIONS; INCORPORATION BY REFERENCE

This application is related to U.S. patent application Ser. No. 15/267,748, filed Sep. 16, 2016; each of which is hereby incorporated by reference.

TECHNICAL FIELD

The present disclosure relates to garbage collection. In particular, the present disclosure relates to tracking garbage collection states of references.

BACKGROUND

A compiler converts source code, which is written according to a specification directed to the convenience of the programmer, to machine code (also referred to as "native code" or "object code"). Machine code is executable directly by a physical machine environment. Additionally or alternatively, a compiler converts source code to an intermediate representation (also referred to as "virtual machine code/instructions"), such as bytecode, which is executable by a virtual machine that is capable of running on top of a variety of physical machine environments. The virtual machine instructions are executable by the virtual machine in a more direct and efficient manner than the source code. Converting source code to virtual machine instructions includes mapping source code functionality, according to the specification, to virtual machine functionality, which utilizes underlying resources (such as data structures) of the virtual machine. Often, functionality that is presented in simple terms via source code by the programmer is converted into more complex steps that map more directly to the instruction set supported by the underlying hardware on which the virtual machine resides.

A virtual machine executes an application and/or program by executing an intermediate representation of the source code, such as bytecode. An interpreter of the virtual machine converts the intermediate representation into machine code. As the application is executed, certain memory (also referred to as "heap memory") is allocated for objects created by the program. A garbage collection system may be used to automatically reclaim memory locations occupied by objects that are no longer being used by the application. Garbage collection systems free the programmer from having to explicitly specify which objects to deallocate. However, applications often need to pause while waiting for garbage collection operations to complete. One way to reduce these pause times is to use a garbage collector that supports concurrent garbage collection operations in at least some phases of a garbage collection cycle. Applications need only pause during non-concurrent garbage collection operations but may run concurrently (including continuing to allocate new objects if necessary) during concurrent garbage collection operations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 illustrates a heap reference and a dereferenceable reference according to an embodiment.

FIGS. 8A-D illustrate a garbage collection process according to an embodiment.

FIG. 15 illustrates a set of paths for bringing a heap reference from a current garbage collection state to a good garbage collection state according to an embodiment.

DETAILED DESCRIPTION

Figure 1:
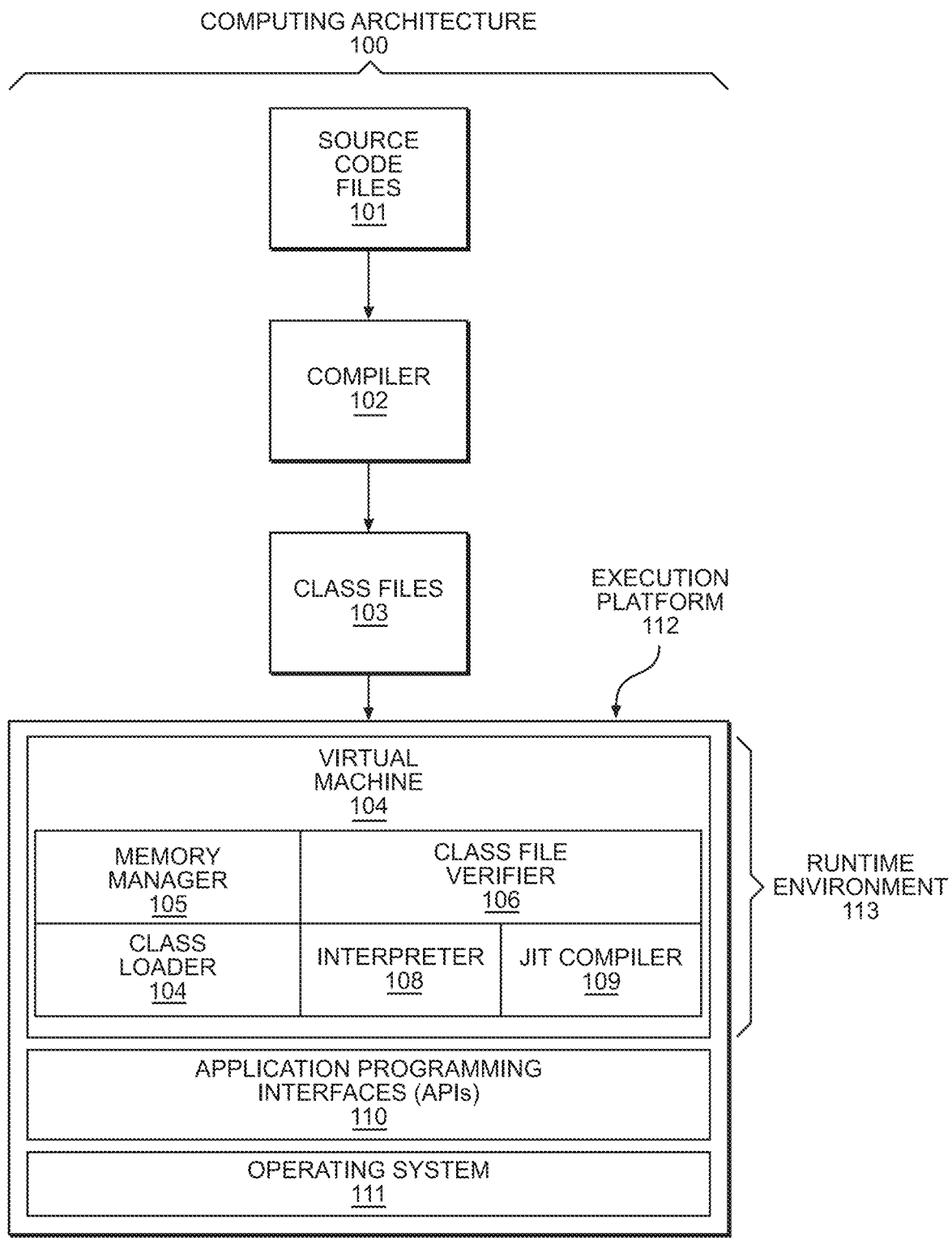
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE 2.3 LOADING, LINKING, AND INITIALIZING
3. GARBAGE COLLECTION
4. LOAD AND WRITE BARRIERS
5. MARKING A HEAP REFERENCE BY A GARBAGE COLLECTION THREAD
6. LOADING A HEAP REFERENCE BY AN APPLICATION THREAD
7. WRITING A HEAP REFERENCE BY AN APPLICATION THREAD
8. LOADING A COMPILED METHOD BY AN APPLICATION THREAD
9. MISCELLANEOUS; EXTENSIONS
10. HARDWARE OVERVIEW

1. General Overview

One or more embodiments include performing garbage collection based on garbage collection states (also referred to as "colors") that (a) are stored with heap references but (b) are not stored with references that may be used for accessing underlying objects as part of execution of an application. A set of garbage collection (GC) states are used to track a progress of GC operations with respect to a heap reference. A heap reference includes an indication of a current GC state associated with the heap reference. Based on the current GC state, and a current phase of a current GC cycle, certain GC operations are selected for processing the heap reference. Meanwhile, a reference that may be used for accessing an underlying object as part of execution of an application (also referred to as "dereferenceable reference") does not include any indication of any of the set of GC states. Such dereferenceable references include, for example, references stored in a call stack, and references embedded in a compiled method stored on code cache. Hence, a reference in the heap memory indicates one of a set of GC states as being associated with the heap reference; but a reference stored in a call stack, pointing to the same object, does not include any indication of any of the set of GC states. Moreover, a reference in the heap memory indicates one of a set of GC states as being associated with the heap reference; but a reference embedded within a compiled method stored in a code cache does not include any indication of any of the set of GC states.

One or more embodiments include implementing a reference load barrier when loading a reference from a heap memory to a call stack. An application thread, which may run concurrently with a GC thread, requests to load a reference from heap memory onto a call stack. The heap reference includes an indication of a current GC state of the heap reference. A check is performed to determine whether the current GC state is "good," relative to a current phase of a current GC cycle. If the current GC state is not good, a set of GC operations are performed to bring the heap reference from the current GC state to the good GC state. The heap reference is updated to indicate the good GC state as the current GC state. However, the reference is stored onto the call stack after removal of the indication of the GC state. The reference on the call stack, pointing to the same object as the heap reference, does not include any indication of a set of GC states.

One or more embodiments include implementing a reference write barrier when writing a reference onto heap memory. An application thread, which may run concurrently with a GC thread, requests to write a reference onto heap memory. Prior to writing onto the heap memory, the reference does not necessarily include any indication of any of a set of GC states. A good GC state, relative to a current phase of a current GC cycle, is determined. The reference is written onto the heap memory after adding an indication of the good GC state as the current GC state of the reference. The reference on the heap memory, pointing to the same object as the reference to be written, includes an indication of the current GC state of the reference.

One or more embodiments include implementing a compiled method load barrier when loading a compiled method from code cache. An application thread, which may run concurrently with a GC thread, requests to load a compiled method (also referred to as a "native method") from a code cache. A compiled method is a method that has been converted from a higher level language (such as bytecode) to a lower level language (such as machine code). A compiled method is associated with a GC state that is implicated to a set of references embedded within the compiled method. Metadata of the compiled method includes an indication of the current GC state of the compiled method—which by implication is the current GC state of the set of references embedded in the compiled method. A check is performed to determine whether the current GC state is "good," relative to a current phase of a current GC cycle. If the current GC state is not good, a set of GC operations is iterated with respect to each reference embedded in the compiled method to bring each reference from the current GC state to the good GC state. The metadata of the compiled method is updated to indicate the good GC state as the current GC state. However, the references embedded in the compiled method themselves do not include any indication of any of a set of GC states.

One or more embodiments include storing a GC state of a reference in a non-addressable portion of the reference, rather than an addressable portion of the reference. In some embodiments, a hardware system (such as a processor) caps the number of bits within a reference (these bits are referred to herein as an "addressable portion" of the reference) that are used for storing memory addresses. The addressable portion defines the maximum address space that can be reached by the reference, as allowed by the hardware system. In some embodiments, the hardware system requires that a non-addressable portion of a reference comply with canonical form before being dereferenced. Yet the hardware system does not impose such a requirement on a reference when the reference is not being dereferenced, such as, when the reference is being stored on heap memory. The non-addressable portion of the reference may be used for other purposes when the reference is not being dereferenced. Given that one of a set of GC states is stored in a heap reference but not in a dereferenceable reference, certain bits in the non-addressable portion of the heap reference may be used for storing the GC state, while the same bits of the dereferenceable reference may continue to comply with canonical form. Therefore, bits within the addressable portion of the reference are not designated for storing the set of GC states, but rather may be reserved for indicating unique memory locations within the maximum address space reachable by the reference.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C #, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
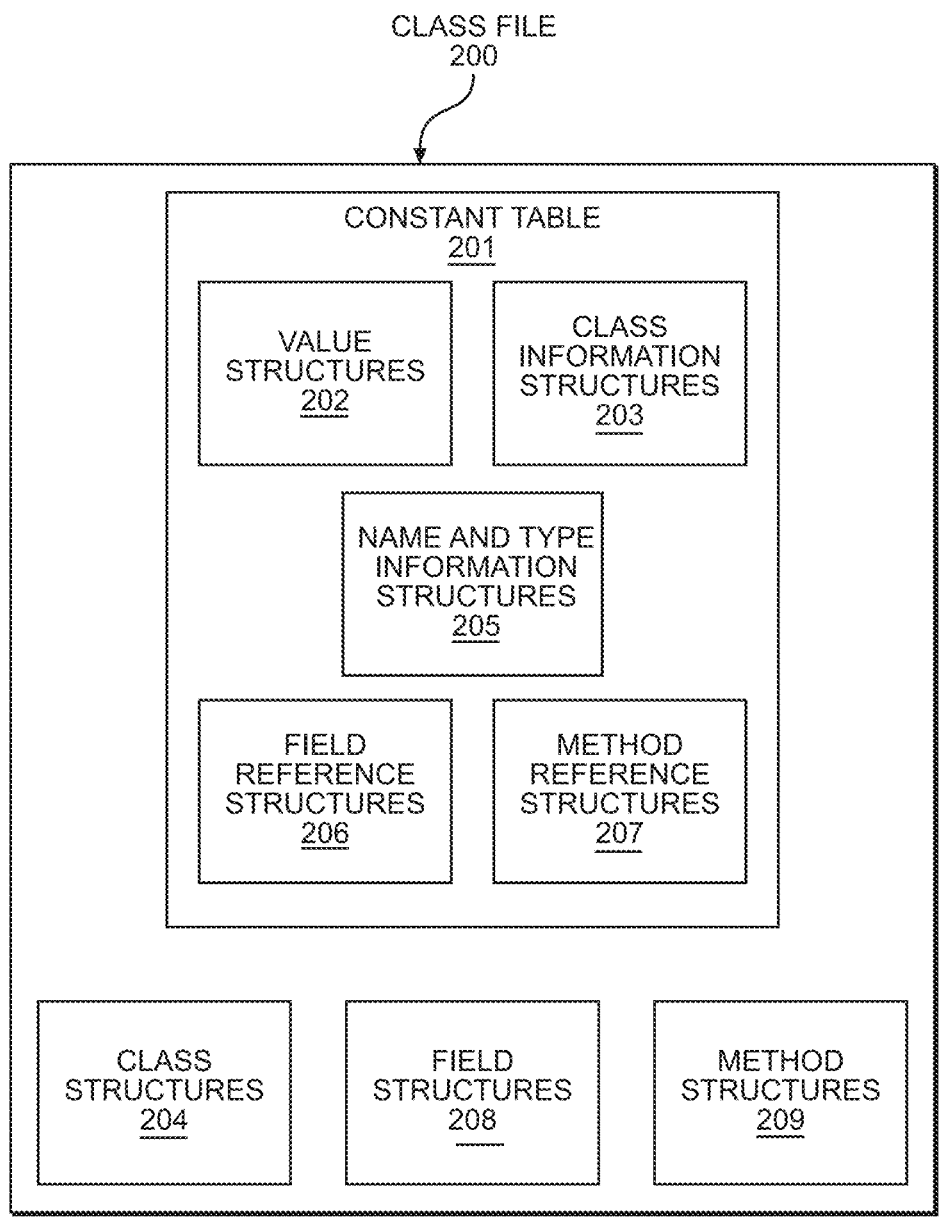
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
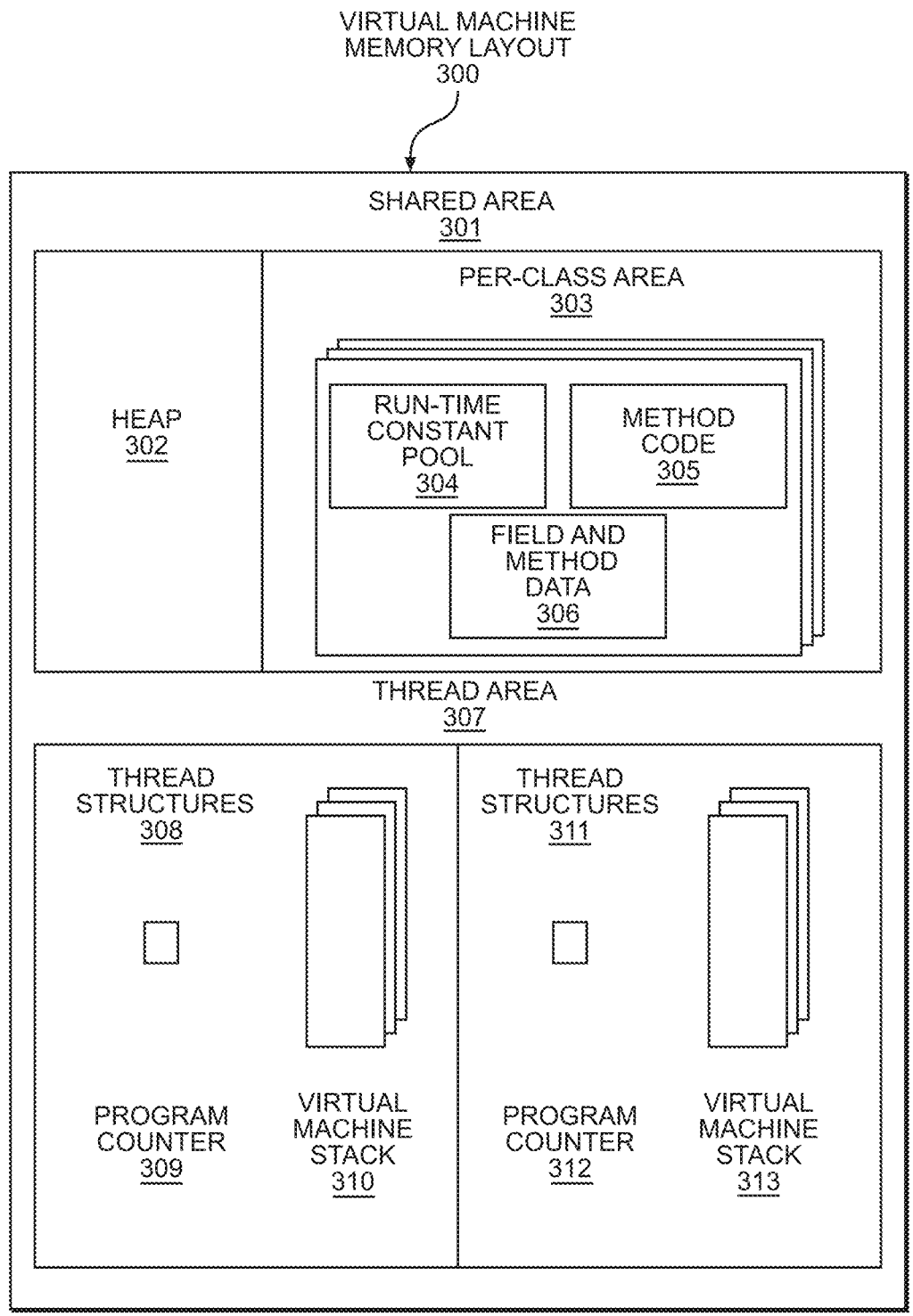
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
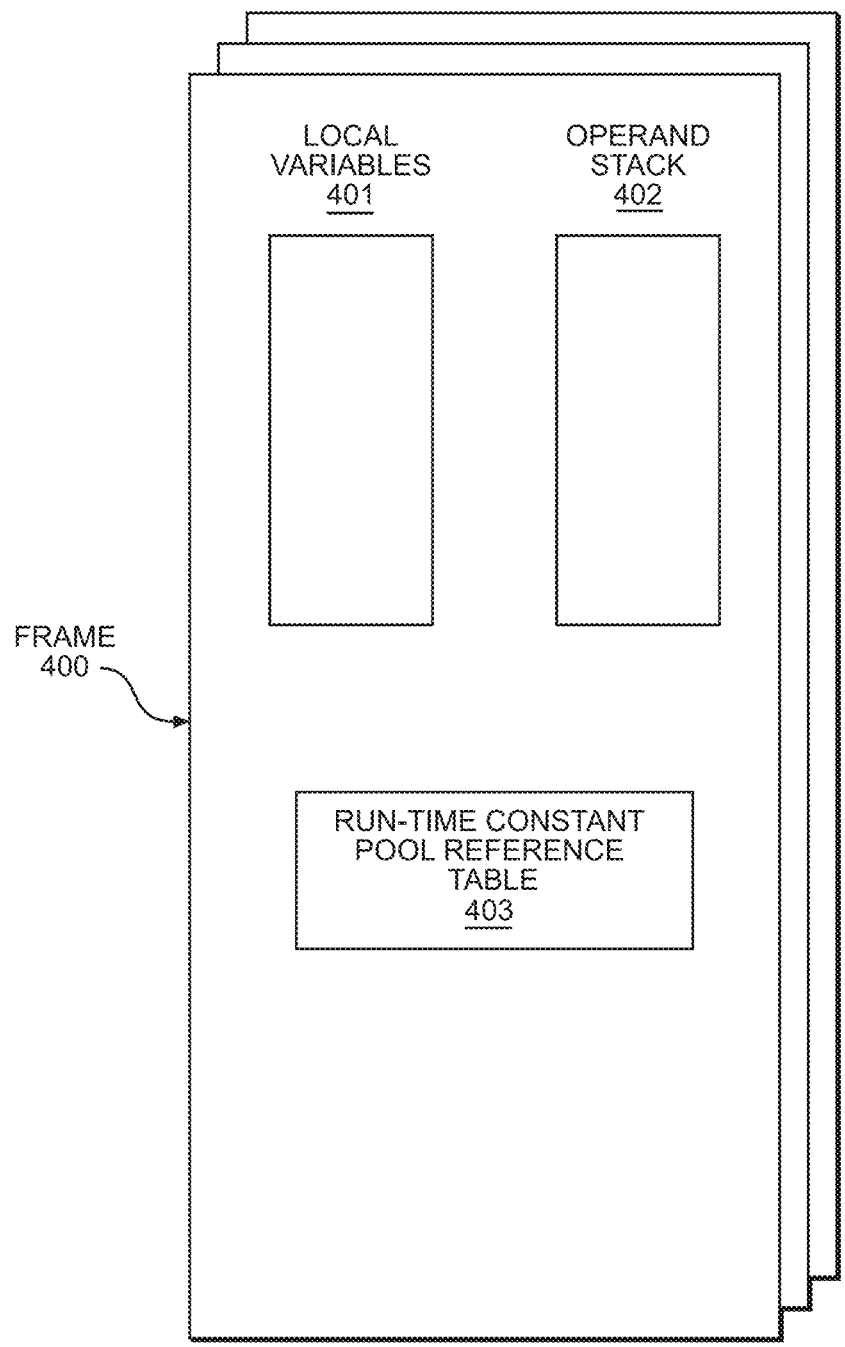
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Garbage Collection

Figure 5:
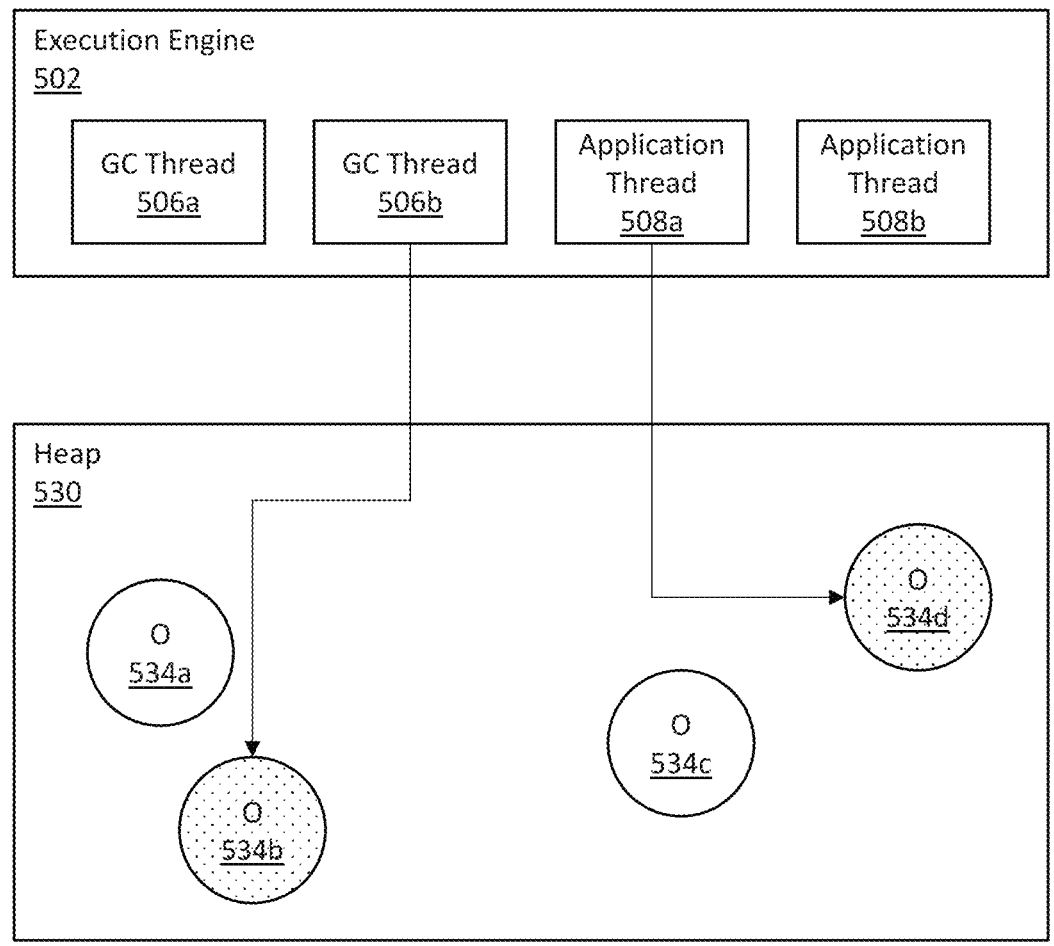
FIG. 5 illustrates an execution engine and a heap memory of a virtual machine according to an embodiment.

FIG. 5 illustrates an execution engine and a heap memory of a virtual machine according to an embodiment. As illustrated in FIG. 5, a system 500 includes an execution engine 502 and a heap 530. The system 500 may include more or fewer components than the components illustrated in FIG. 5. The components illustrated in FIG. 5 may be local to or remote from each other.

In one or more embodiments, a heap 530 represents the run-time data area from which memory for class instances and arrays is allocated. An example of a heap 530 is described above as heap 302 in FIG. 3.

A heap 530 stores objects 534*a-d* that are created during execution of an application. An object stored in a heap 510 may be a normal object, an object array, or another type of object. A normal object is a class instance. A class instance is explicitly created by a class instance creation expression. An object array is a container object that holds a fixed number of values of a single type. The object array is a particular set of normal objects.

A heap 530 stores live objects 534*b*, 534*d* (indicated by the dotted pattern) and unused objects 534*a*, 534*c* (also referred to as "dead objects," indicated by the blank pattern). An unused object is an object that is no longer being used by any application. A live object is an object that is still being used by at least one application. An object is still being used by an application if the object is (a) pointed to by a root reference (which is further described below with respect to root references 820 of FIG. 8) or (b) traceable from another object that is pointed to by a root reference. A first object is "traceable" from a second object if a reference to the first object is included in the second object.

Sample code may include the following:

```
class Person {
    public String name;
    public int age;
```

```
    public static void main(String[ ] args) {
        Person temp = new Person( );
        temp.name = "Sean";
        temp.age = 3;
    }
}
```

An application thread 508*a* executing the above sample code creates an object temp in a heap 530. The object temp is of the type Person and includes two fields. Since the field age is an integer, the portion of the heap 530 that is allocated for temp directly stores the value "3" for the field age. Since the field name is a string, the portion of the heap 530 that is allocated for temp does not directly store the value for the name field; rather the portion of the heap 530 that is allocated for temp stores a reference to another object of the type String. The String object stores the value "Sean." The String object is referred to as being "traceable" from the Person object.

In one or more embodiments, an execution engine 502 includes one or more threads configured to execute various operations. As illustrated, for example, an execution engine 502 includes garbage collection (GC) threads 506*a-b* and application threads 508*a-b*.

In one or more embodiments, an application thread 508*a-b* is configured to perform operations of one or more applications. An application thread 508*a-b* creates objects during run-time, which are stored onto a heap 530. An application thread 508*a-b* may also be referred to as a "mutator," because an application thread 508*a-b* may mutate the heap 530 (during concurrent phases of GC cycles and/or between GC cycles).

In one or more embodiments, a GC thread 506*a-b* is configured to perform garbage collection. A GC thread 506*a-b* iteratively performs GC cycles based on a schedule and/or an event trigger (such as when a threshold allocation of a heap (or region thereof) is reached). A GC cycle includes a set of GC operations for reclaiming memory locations in a heap that are occupied by unused objects.

In an embodiment, multiple GC threads 504*a-b* may perform GC operations in parallel. The multiple GC threads 504*a-b* working in parallel may be referred to as a "parallel collector."

In an embodiment, GC threads 504*a-b* may perform at least some GC operations concurrently with the execution of application threads 508*a-b*. The GC threads 504*a-b* that operate concurrently with application threads 508*a-b* may be referred to as a "concurrent collector" or "partially-concurrent collector."

In an embodiment, GC threads 504*a-b* may perform generational garbage collection. A heap is separated into different regions. A first region (which may be referred to as a "young generation space") stores objects that have not yet satisfied a criteria for being promoted from the first region to a second region; a second region (which may be referred to as an "old generation space") stores objects that have satisfied the criteria for being promoted from the first region to the second region. For example, when a live object survives at least a threshold number of GC cycles, the live object is promoted from the young generation space to the old generation space.

Various different GC processes for performing garbage collection achieve different memory efficiencies, time efficiencies, and/or resource efficiencies. In an embodiment, different GC processes may be performed for different heap regions. As an example, a heap may include a young generation space and an old generation space. One type of GC process may be performed for the young generations space. A different type of GC process may be performed for the old generation space.

Examples of different GC processes are described below. As an example, a copying collector involves at least two separately defined address spaces of a heap, referred to as a "from-space" and a "to-space." A copying collector identifies live objects stored within an area defined as a from-space. The copying collector copies the live objects to another area defined as a to-space. After all live objects are identified and copied, the area defined as the from-space is reclaimed. New memory allocation may begin at the first location of the original from-space.

Copying may be done with at least three different regions within a heap: an Eden space, and two survivor spaces, S1 and S2. Objects are initially allocated in the Eden space. A GC cycle is triggered when the Eden space is full. Live objects are copied from the Eden space to one of the survivor spaces, for example, S1. At the next GC cycle, live objects in the Eden space are copied to the other survivor space, which would be S2. Additionally, live objects in S1 are also copied to S2.

As another example, a mark-and-sweep collector separates GC operations into at least two stages: a mark stage and a sweep stage. During the mark stage, a mark-and-sweep collector marks each live object with a "live" bit. The live bit may be, for example, a bit within an object header of the live object. During the sweep stage, the mark-and-sweep collector traverses the heap to identify all non-marked chunks of consecutive memory address spaces. The mark-and-sweep collector links together the non-marked chunks into organized free lists. The non-marked chunks are reclaimed. New memory allocation is performed using the free lists. A new object may be stored in a memory chunk identified from the free lists.

A mark-and-sweep collector may be implemented as a parallel collector. Additionally or alternatively, a mark-and-sweep collector may be implemented as a concurrent collector. Example phases within a GC cycle of a concurrent mark-and-sweep collector include:

Phase 1: Identify the objects referenced by root references (this is not concurrent with an executing application)

Phase 2: Mark reachable objects from the objects referenced by the root references (this may be concurrent)

Phase 3: Identify objects that have been modified as part of the execution of the program during Phase 2 (this may be concurrent)

Phase 4: Re-mark the objects identified at Phase 3 (this is not concurrent)

Phase 5: Sweep the heap to obtain free lists and reclaim memory (this may be concurrent)

As another example, a compacting collector attempts to compact reclaimed memory areas. A heap is partitioned into a set of equally sized heap regions, each a contiguous range of virtual memory. A compacting collector performs a concurrent global marking phase to determine the liveness of objects throughout the heap. After the marking phase completes, the compacting collector identifies regions that are mostly empty. The compacting collector collects these regions first, which often yields a large amount of free space. The compacting collector concentrates its collection and compaction activity on the areas of the heap that are likely to be full of reclaimable objects, that is, garbage. The compacting collector copies live objects from one or more regions of the heap to a single region on the heap, and in the process both compacts and frees up memory. This evacuation may be performed in parallel on multiprocessors to decrease pause times and increase throughput.

Example phases within a GC cycle of a concurrent compacting collector include:

Phase 1: Identify the objects referenced by root references (this is not concurrent with an executing application)

Phase 2: Mark reachable objects from the objects referenced by the root references (this may be concurrent)

Phase 3: Identify objects that have been modified as part of the execution of the program during Phase 2 (this may be concurrent)

Phase 4: Re-mark the objects identified at Phase 3 (this is not concurrent)

Phase 5: Copy live objects from a source region to a destination region, to thereby reclaim the memory space of the source region (this is not concurrent)

As another example, a load-barrier collector marks and compacts live objects but lazily remaps references pointing to the relocated objects. A load-barrier collector relies on "colors" embedded within references stored on the heap. A color represents a GC state, and tracks a progress of GC operations with respect to a reference. A color is captured by metadata stored within certain bits of a reference.

At every moment in time, all GC threads 506a-b agree on what color is the "good color," or "good GC state." A GC thread 506a-b loading a reference from a heap 530 to a call stack first applies a check to determine whether a current color of the reference is good. Similarly, an application thread 508a-b loading a reference from a heap 530 to a call stack first applies a check to determine whether a current color of the reference is good. The check may be referred to as a "load barrier." A good-colored reference will hit a fast path that incurs no additional work. Otherwise, the reference will hit a slow path. The slow path involves certain GC operations that bring the reference from the current GC state to the good GC state. The slot where the reference resides in the heap 530 is updated with a good-colored alias to avoid hitting the slow path subsequently (updating to a good color may also be referred to as "self-healing").

For example, a stale reference (a reference to an object that has been moved concurrently during compaction, meaning the address may point to an outdated copy of the object, or another object, or even nothing) is guaranteed to not have the good color. An application thread attempting to load the reference from a heap first executes a load barrier. Through the load barrier, the reference is identified as stale (not being of a good color). The reference is hence updated to point to the new location of the object and to be associated with the good color. The reference with the updated address and the good color is stored into the heap. The reference with the updated address may also be returned to the application thread. However, the reference returned to the application thread does not necessarily include any color.

Additional and/or alternative types of GC processes, other than those described above, may be used. Other types of GC processes may also rely on "colors" of references, or metadata relating to garbage collection stored within references.

In an embodiment, a color is stored with a heap reference but is not stored with a dereferenceable reference. The term "heap reference" refers to a reference stored on a heap 530. The term "dereferenceable reference" refers to a reference that an execution engine uses to access a value of an object being pointed to by the reference. Obtaining a value of an object being pointed to by a reference is referred to as "dereferencing" the reference. A GC thread 506a-b attempting to dereference a reference stored on a heap 530 first loads the reference from the heap 530 to a call stack of the GC thread 506a-b. An application thread 508a-b attempting to dereference a reference stored on a heap 530 first loads the reference from the heap 530 to a call stack of the application thread 508a-b. (For example, an application thread loads the reference into local variables 401, within frame 400, of a call stack, as described above with reference to FIG. 4.) Heap references and/or dereferenceable references are generally referred to herein as "references."

Referring to FIG. 6, FIG. 6 illustrates a heap reference and a dereferenceable reference according to an embodiment. A reference may include any number of bits, depending on the computing environment. In an Intel x86-64 machine, for example, a reference has 64 bits.

In an embodiment, a dereferenceable reference 601 includes a non-addressable portion 602 and an addressable portion 604. An addressable portion 604 defines the maximum address space that can be reached by the reference 601. Depending on the hardware system upon which an application executes, a non-addressable portion 602 may be required to comply with canonical form before the reference 601 is dereferenced. If such a requirement is imposed, the hardware system (such as a processor) generates an error when attempting to dereference a non-compliant dereferenceable reference. Hence, the non-addressable portion 602 of the reference 601 cannot be used for storing any GC-related metadata, such as GC states. In an Intel x86-64 machine, for example, an addressable portion of a reference has 48 bits, and a non-addressable portion has 16 bits. Based on the restrictions imposed by the hardware, a reference can reach at most $2^{48}$ unique addresses. Canonical form requires that the non-addressable portion be a sign extension 611 of the value stored in the addressable portion (that is, the high-order bits 48 through 63 must be copies of the value stored in bit 47).

As illustrated, addressable portion 604 includes address 620 and optionally other bits 618. The address 620 refers to the address of the object being pointed to by reference 600. The other bits 618 may be unused. Alternatively, the other bits 618 may store metadata, which may be but is not necessarily related to garbage collection.

As described above, dereferenceable references 601 include references stored on call stacks. Additionally or alternatively, dereferenceable references 601 include references embedded within compiled methods stored on a code cache and/or other memory location. A compiled method is a method that has been converted from a higher-level language (such as bytecode) to a lower-level language (such as machine code). An application thread may directly access a compiled method within the code cache, or other memory location, to execute the compiled method. As an example, a compiled method may be generated by a JIT Compiler 109 of FIG. 1. As another example, a compiled method may be generated by another component of a virtual machine.

In an embodiment, a heap reference 600 includes the same non-addressable portion 602 and addressable portion 604. However, non-addressable portion 602 need not necessarily comply with canonical form. As illustrated, non-addressable portion 602 of heap reference 600 includes transient color 606 and optionally other bits 610. Transient color 606 represents a GC state that tracks a progress of GC operations with respect to reference 600. Color 606 is "transient" because the color 606 need not stay with the reference when the reference is loaded from a heap 530 to a call stack. The other bits 610 may be unused. Alternatively, the other bits 610 may store metadata, which may be but is not necessarily related to garbage collection.

In an embodiment, transient colors 606 include M0, M1, and Remap. In an embodiment, each color is represented by a bit within heap reference 600. Bit M0 616 represents the M0 GC state. Bit M1 614 represents the M1 GC state. Bit R 612 represents the Remap GC state. Only one of M0 616, M1 614, R 612 is set at any point in time to indicate the current GC state of the heap reference 600. In another embodiment, transient colors 606 M0, M1, and Remap are expressed in different ways within heap reference 600. The colors M0, M1, and Remap are explained in further detail below with reference to FIGS. 7-8. In still another embodiment, transient colors 606 may represent a different set of GC states altogether. Transient colors 606 may represent GC states used in additional and/or alternative types of GC processes.

In an embodiment, transient color 606 (within the non-addressable portion 602) represents one set of GC states, while the other bits 618 (within the addressable portion 604) represents another set of GC states. Transient color 606 may represent one of a mutually exclusive set of GC states (such as M0, M1, and R), whereas the other bits 618 may represent one or more other GC states that are not mutually exclusive with the mutually exclusive set of GC states. The other bits 618 may track, for example, an age of a reference.

Figure 7:
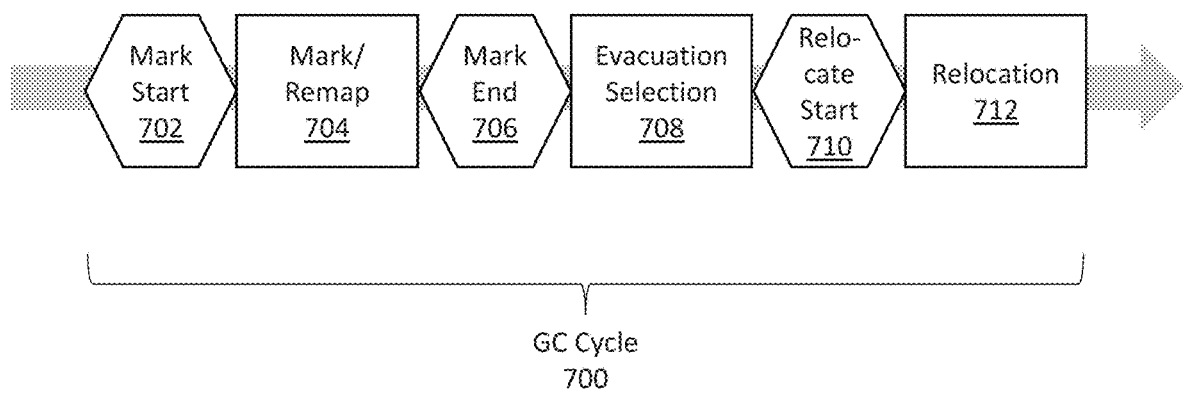
FIG. 7 illustrates a garbage collection cycle according to an embodiment.

FIG. 7 illustrates a garbage collection cycle according to an embodiment. A GC cycle 700 includes the following phases: Mark Start 702, Mark/Remap 704, Mark End 706, Evacuation Selection 708, Relocate Start 710, and Relocation 712. Of the above phases, the following are non-concurrent phases (indicated by a hexagon): Mark Start 702, Mark End 706, and Relocate Start 710. All application threads 508a-b must pause during the non-concurrent phases (also referred to as a "stop-the world pause" or "STW pause"). The following are concurrent phases (indicated by a rectangle): Mark/Remap 704, Evacuation Selection 708, and Relocation 712. Detailed discussion of the phases follows. Additional and/or alternative operations, other than what is discussed below, may also be performed in each phase.

Mark Start 702 (STW). A GC cycle starts with a STW pause. During Mark Start 702, one of M0 or M1 is selected as the "good color." If M0 is selected as the good color during the current GC cycle 700, then M1 is selected as the good color during the Mark Start phase of the next GC cycle. If M0 is the current good color, then M0 is referred to as the "current mark bit" and M1 is referred to as the "old mark bit." During Mark Start 702, one or more GC threads 506a-b identify all root references.

Mark/Remap 704 (Concurrent). After Mark Start 702, the GC threads 506a-b perform object graph traversal to identify and mark all live objects. If a stale reference is found in the heap 530 during this process, the reference is updated with the current address of the object it refers to. The reference in the heap 530 is also updated to indicate the good color. This guarantees that no stale references remain in heap after Mark/Remap 704 has completed.

Optionally, per-page liveness information (the total number and the total size of live objects on each memory page) is recorded. The liveness information may be used to select pages for evacuation during Evacuation Selection 708.

Mark End 706 (STW). The GC threads 506a-b confirm that marking is complete.

Evacuation Selection 708 (Concurrent). The GC threads 506a-b select pages (or other portions) of memory for evacuation. The GC threads 506a-b may select evacuation pages based on per-page liveness information recorded during Mark/Remap 704.

Relocate Start 710 (STW). During Relocate Start 710, the good color changes to R, which effectively invalidates all references. The GC threads 506*a-b* relocate all objects, stored in the evacuation pages, that are pointed to by root references. The GC threads 506*a-b* relocate the objects to one or more destination regions. In an embodiment, the GC threads 506*a-b* select an empty region as a destination for the relocated objects. In another embodiment, additional and/or alternative methods may be used for selecting a destination for the relocated objects. The GC threads 506*a-b* also remap all root references. One or more forwarding tables (such as per-page forwarding tables) are used to record a map from old addresses to new. The forwarding tables are consulted by the application threads 508*a-b* when accessing stale references, or by the GC threads 506*a-b* during Mark/Remap 604 of the next GC cycle (if no application thread 508*a-b* has accessed the stale references).

Relocation 712 (Concurrent). The GC threads 506*a-b* relocate the remaining live objects that are stored in the evacuation pages. The GC threads 506*a-b* relocate the objects to one or more destination regions. References to the relocated objects thereby become stale. As described above with reference to Relocate Start 710, one or more forwarding tables (such as per-page forwarding tables) are used to record a map from old addresses to new. The forwarding tables are consulted by the application threads 508*a-b* when accessing stale references, or by the GC threads 506*a-b* during Mark/Remap 604 of the next GC cycle (if no application thread 508*a-b* has accessed the stale references).

FIGS. 8A-D illustrate a garbage collection process according to an embodiment. In the example, references include 24 bits. The lower-order 16 bits indicate an address of an object. Bit 17 indicates M0, bit 18 indicates M1, bit 19 indicates R, and the remaining bits are unused. Hence, for example, a reference indicating the address 1234 (in hexadecimal) and the color R would be "041234" (in hexadecimal). Also in the example, a heap 830 includes regions 832*a-c*. The heap 830 stores objects 834*a-g*.

In the example, a bad bit mask 800 is maintained. The bad bit mask 800 indicates the current good color. In an embodiment, the value for the bad bit mask 800 has 1's only in the bit positions corresponding to bad colors, and 0's in all remaining bits. For example, if the good color is R, then the bad bit mask would be "030000" (in hexadecimal, which is a "1" for the M0 and M1 bits (the bad colors), and a "0" for all remaining bits).

A bad bit mask 800 may be stored at one or more memory locations to ensure accessibility by all GC threads and/or application threads. The particular memory locations depend on the software and/or hardware computing environment. In an embodiment, a copy of the bad bit mask 800 is stored in a respective thread-local variable for each thread. Each thread thus has access to the bad bit mask 800 through the thread's own thread-local variable. When changing the bad bit mask 800, each thread-local variable is updated. In another embodiment, the bad bit mask 800 is embedded into the code stream. Each reference load barrier includes an instruction that (a) specifies a value of the bad bit mask and (b) stores the specified value of the bad bit mask into a temporary register. A thread accesses the temporary register to obtain the bad bit mask. A compiled method load barrier (such as method load barrier 1210 of FIG. 12) locates each such instruction, which specifies a value for the bad bit mask, in the instruction sequences. The compiled method load barrier patches the value for the bad bit mask, indicated by such instructions, based on the good color for a current GC phase. The compiled method load barrier may use cross modifying code to make the patches. In another embodiment, a value for the bad bit mask is stored in a particular register that is accessible to all threads. During a STW phase, a global variable is updated based on the good color for a current GC phase. Before exiting the STW phase, the value for the bad bit mask is loaded from the global variable to the particular register. Additional and/or alternative methods for maintaining a bad bit mask 800 may be used.

Figure 8A:
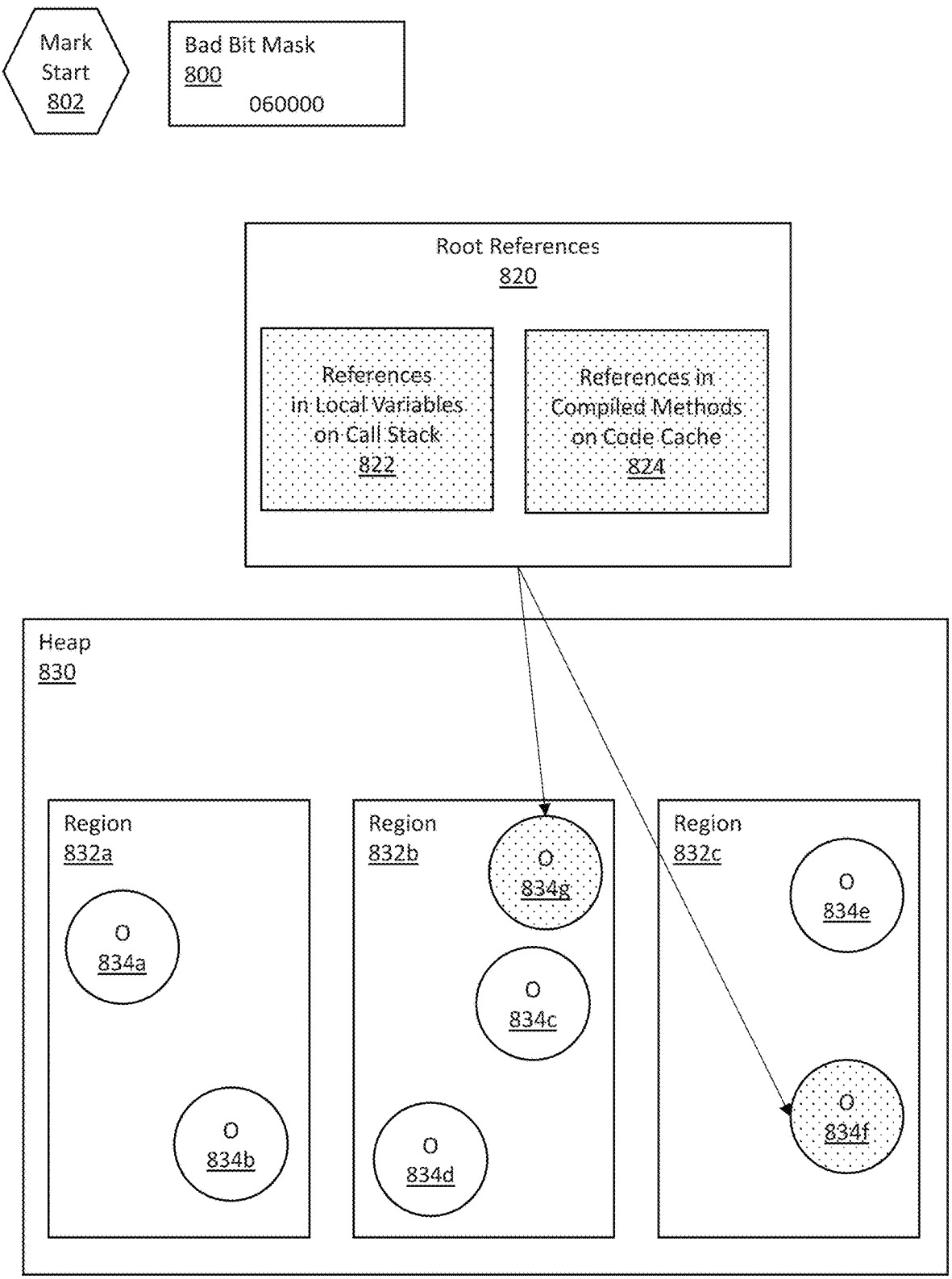

Referring to FIG. 8A, the current GC phase is Mark Start 802. M0 may be selected as the "good color." A bad bit mask 800 is set to "060000" (in hexadecimal, which is a "1" for the M1 and R bits (the bad colors), and a "0" for all remaining bits). The bad bit mask 800 is used in a load barrier to check whether a reference is of a good color. When a logical bit-wise AND operation is applied to the bad bit mask 800 and a heap reference of a good color, the result would be all 0's. Conversely, when a logical bit-wise AND operation is applied to the bad bit mask 800 and a heap reference of a bad color, the result would not be all 0's.

During Mark Start 802, one or more GC threads identify all root references 820. Root references include references 822 in local variables on one or more call stacks, and references 824 in compiled methods on code cache that are reachable from the call stacks. As illustrated, based on root references 820, objects 834*f* and 834*g* are marked as live (as indicated by the dotted pattern).

Referring to FIG. 8B, the current GC phase is Mark/Remap 804. The bad bit mask 800 continues to be "060000." The GC threads perform object graph traversal to identify and mark all live objects. If a stale reference is found, then the address of the stale reference is remapped based on a forwarding table (further discussed below with reference to FIG. 8D). Examples of operations performed during Mark/Remap 804 are further described below with reference to FIG. 13.

As illustrated, tracing through object 834*g* leads to object 834*a*. Tracing through object 834*f* leads to object 834*c*. Hence, objects 834*a* and 834*c* are marked as live (as indicated by the dotted pattern). Therefore, the live objects in heap 830 include objects 834*a*, 834*c*, 834*f*, and 834*g*. The unused objects in heap 830 include objects 834*b*, 834*d*, and 834*e*.

Per-region liveness information is recorded. Region 832*a* has one live object; region 832*b* has two live objects; region 832*c* has one live object.

Not illustrated, the GC phases Mark Stop 806 and Evacuation Selection 808 are performed. During Mark Stop 806, the GC threads confirm that marking is complete. During Evacuation Selection 808, the GC threads select one or more regions for evacuation. The GC threads may select regions 832*a* and 832*c* to be evacuated, since the largest number of live objects reside in region 832*b*. Additionally or alternatively, the GC threads may select regions 832*a* and 832*c* to be evacuated, since the number of live objects in each of regions 832*a* and 832*c* fall below a threshold value.

Referring to FIG. 8C, the current GC phase is Relocate Start 810. The bad bit mask 800 is updated to "030000" (in hexadecimal). When a logical bit-wise AND operation is applied to the bad bit mask 800 and a heap reference with the remap bit set (that is, the good color), the result would be all 0's. Conversely, when a logical bit-wise AND operation is applied to the bad bit mask 800 and a heap reference with either mark bit set (that is, a bad color), the result would not be all 0's.

During Relocate Start 810, the GC threads relocate all objects, stored in the evacuation regions, that are pointed to by root references 820. Objects pointed to by root references 820 include objects 834*f* and 834*g*. Object 834*f* resides in an evacuation region, therefore object 834*f* is relocated from region 832*c* to region 832*b*. Object 834*g* already resides in a non-evacuation region, therefore object 834*g* is not relocated.

During Relocate Start 810, the GC threads also remap root references. Since object 834*f* is relocated, the root reference pointing to object 834*f* is remapped to point to the new location, within region 832*b*, of object 834*f*. In an embodiment, a forwarding table (not illustrated) records a map from an old address, within region 832*c*, of object 834*f* to a new address, within region 832*b*, of object 834*f*.

Referring to FIG. 8D, the current GC phase is Relocation 812. The bad bit mask 800 continues to be "030000." The GC threads relocate the remaining live objects that are stored in the evacuation regions, that is, object 834*a*. A forwarding table 840 records a map from an old address, within region 832*a*, of object 834*a* to a new address, within region 832*b*, of object 834*a*. The forwarding table 840 is subsequently used during a lazy remapping of any references pointing to object 834*a*. In an embodiment, a same forwarding table is used for storing all maps of old addresses to new addresses of relocated objects. In another embodiment, different forwarding tables may be used (for example, a different forwarding table may be used for each evacuation page).

Figure 9:
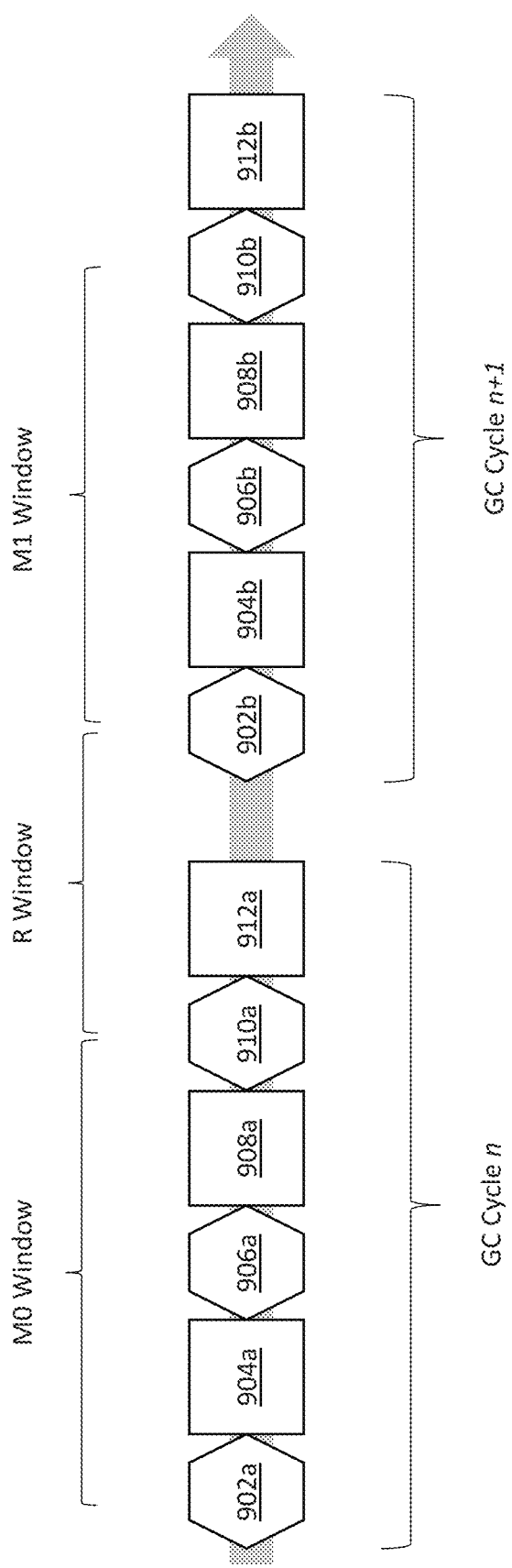
FIG. 9 illustrates multiple garbage collection cycles and corresponding good garbage collection states (or "good colors") according to an embodiment.

FIG. 9 illustrates multiple garbage collection cycles and corresponding good garbage collection states (or "good colors") according to an embodiment. The good color is changed twice per GC cycle, and the window for each choice of good color is shown in FIG. 9.

GC cycle n includes Mark Start 902*a*, Mark/Remap 904*a*, Mark End 906*a*, Evacuation Selection 908*a*, Relocate Start 910*a*, and Relocation 912*a*. GC cycle n+1 includes Mark Start 902*b*, Mark/Remap 904*b*, Mark End 906*b*, Evacuation Selection 908*b*, Relocate Start 910*b*, and Relocation 912*b*. The good color for Mark Start 902*a*, Mark/Remap 904*a*, Mark End 906*a*, and Evacuation Selection 908*a* may be M0. Hence, an "M0 Window" includes Mark Start 902*a*, Mark/Remap 904*a*, Mark End 906*a*, Evacuation Selection 908*a*. Then, the good color for Relocate Start 910*a*, Relocation 912*a*, and between GC cycle n and GC cycle n+1, is R. Hence, an "R Window" includes Relocate Start 910*a*, Relocation 912*a*, and the time between GC cycle n and GC cycle n+1. For a next GC cycle, the good color for Mark Start 902*b*, Mark/Remap 904*b*, Mark End 906*b*, and Evacuation Selection 908*b* alternates to M1. Hence, an "M1 Window" includes Mark Start 902*b*, Mark/Remap 904*b*, Mark End 906*b*, Evacuation Selection 908*b*. An "R Window" (not illustrated) would then follow for Relocate Start 910*b*, and Relocation 912*b*.

In an embodiment, a particular set of colors is referred to as being "mutually exclusive" where only one of the particular set of colors is "good" at any given time. The remaining colors of the particular set of colors are not good. As illustrated, for example, a particular set of colors includes M0, M1, and R. One and only one of M0, M1, and R is "good" at a given time. Therefore M0, M1, and R may be referred to as a mutually exclusive set of colors.

Additionally or alternatively, a particular set of colors is referred to as being "mutually exclusive" where only one of the particular set of colors is associated with a heap reference at any given time. The remaining colors of the particular set of colors are not associated with the heap reference. For example, a particular set of colors includes M0, M1, and R. One and only one of M0, M1, and R is associated with a particular heap reference at a given time. Therefore M0, M1, and R may be referred to as a mutually exclusive set of colors.

In an embodiment, a heap reference is associated with one and only one of a mutually exclusive set of colors, while a dereferenceable reference does not include any indication of any of the mutually exclusive set of colors. However the dereferenceable reference may include an indication of other GC states, which are not within the mutually exclusive set. Referring back to FIG. 6, for example, bits 612, 614, 616 of heap reference 600 indicate which one of M0, M1, and R is associated with heap reference 600. Meanwhile, dereferenceable reference 601 does not include any indication of any of the colors M0, M1, and R. However, heap reference 600 may additionally include an indication of GC states other than M0, M1, and R. Other bits 618 of heap reference 600 may indicate, for example, an age of a reference. Such information is maintained in other bits 618 of dereferenceable reference 601. Hence dereferenceable reference 601 may include an indication of a GC state that is not within the mutually exclusive set of GC states.

4. Load and Write Barriers

In one or more embodiments, a GC cycle includes one or more concurrent phases. During a concurrent phase, one or more application threads may execute concurrently with one or more GC threads. When an application thread attempts to load a reference from a heap to a call stack, the application thread may execute a reference load barrier. When an application thread attempts to write a reference onto a heap, the application thread may execute a reference write barrier. When an application thread attempts to load a compiled method from code cache, the application thread may execute a compiled method load barrier.

Figure 10:
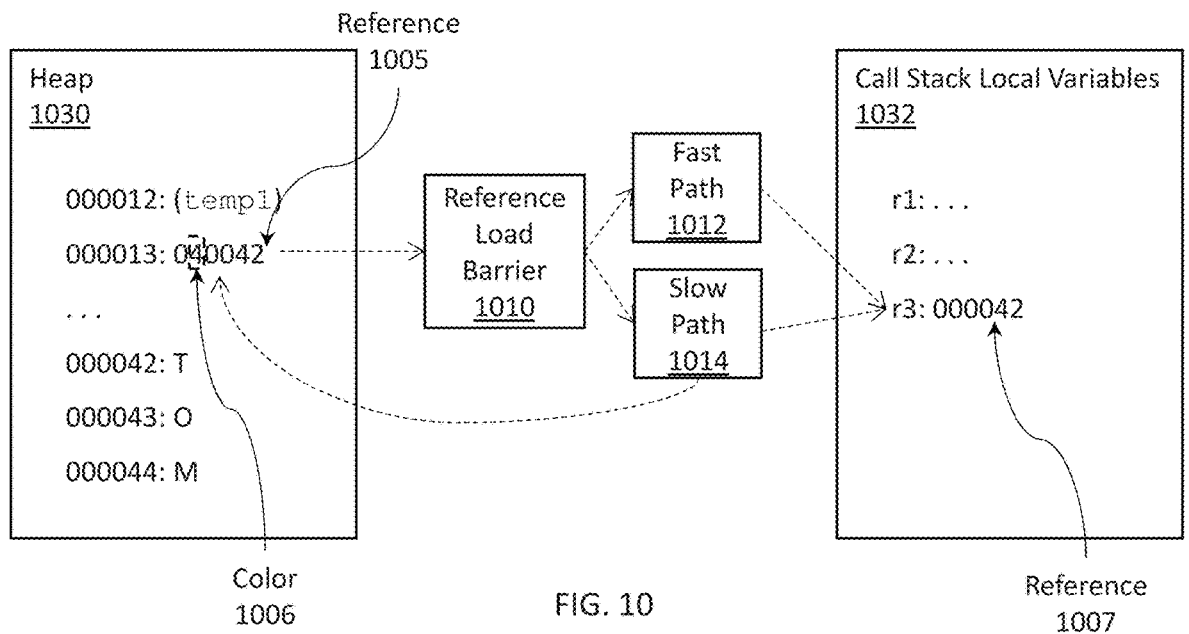
FIG. 10 illustrates a reference load barrier according to an embodiment.

FIG. 10 illustrates a reference load barrier according to an embodiment. As illustrated, a heap 1030 includes addresses 000012, 000013, . . . 000042, 000043, 000044. Call stack local variables 1032 include registers r1, r2, r3. In the example, references include 24 bits. Colors of heap references may be indicated by bits 17-19. Where the color is M0, the hexadecimal value of bits 17-20 is "1" (or "0001" in binary). Where the color is M1, the hexadecimal value of bits 17-20 is "2" (or "0010" in binary). Where the color is Remap, the hexadecimal value of bits 17-20 is "4" (or "0100" in binary).

Sample code may include the following:

```
class Person {
    public String name;
    public static void main(String[ ] args) {
        Person temp1 = new Person( );
        ...
        String temp2 = temp1.name;
    }
}
```

Based on the code line Person temp1=new Person( ), an application thread creates a new object in a heap 1030, and a reference temp1 refers to the new object. The object (referred to by temp1) is of the type Person and includes a name field of the type String. The object (referred to by temp1) is stored at address "000012" within the heap 1030. The name field of the object (referred to by temp1) is stored at address "000013" within the heap 1030. The name field is populated with a reference 1005. The reference 1005 includes a color 1006 and points to address "0042." Hence, address "000042" includes the value of the name of the object (referred to by temp1), and the value is "TOM."

Based on the code line String temp2=temp1.name, the application thread attempts to load the reference 1005 in the name field of the object referred to by temp1. At this point, the color 1006 of the reference 1005 may be, for example, M1, which is represented by the value "4" (in hexadecimal).

The application thread hits a reference load barrier 1010. The reference load barrier 1010 includes instructions to check whether the reference 1005 is of a good color. A logical bit-wise AND operation is applied to the reference 1005 and a bad bit mask. If the return value is 0, then the reference 1005 is of a good color. Otherwise, if the return value is not 0, the reference 1005 is not of a good color.

If the reference 1005 is of a good color, then the application thread takes a fast path 1012. The fast path 1012 does not necessarily involve any GC operations, such as remapping references and/or marking objects as live. The application thread removes the color 1006 from the reference 1005 for storage in the call stack local variables 1032. The application thread may remove the color 1006 by using a color removal mask. The color removal mask may include a "0" for each bit that indicates a color (the M0, M1, and R bits), and "1" for each remaining bit. In the example, bits 17-19 correspond to M0, M1, and R respectively. Therefore, the color removal mask includes "0" for bits 17-19, and "1" for each remaining bit. The color removal mask may be written as F8FFFF (in hexadecimal). A logical bit-wise AND operation is applied to the color removal mask and the reference 1005. Therefore, bits 17-19 become "0" while the remaining bits of the reference 1005 are unchanged. The result "000042" is saved as reference 1007 in the call stack local variables 1032, such as at r3. The application thread may then dereference the reference 1007. The application thread accesses the address indicated by the reference 1007, that is address "000042" within the heap 1030. The application thread obtains the value "TOM" at address "000042" within the heap 1030.

In an embodiment, prior to dereferencing the reference 1007, the application thread may first check whether the reference 1007 complies with canonical form. Canonical form may require that certain bits, including bits 17-19, be a sign extension of a value stored at bits 1-16. Since the color has been removed from bits 17-19 of the reference 1007, the reference 1007 does comply with canonical form. The application thread may thus dereference the reference 1007.

If the reference 1005 is not of a good color, then the application thread takes a slow path 1014. The application thread may select one of a pool of slow paths, based a current color 1006 indicated by the reference 1005. The application thread may, for example, remap an address indicated by the reference 1005. The application may, for example, mark an object pointed to by the reference 1005 as live. Then the application thread updates the color 1006 of the reference 1005 to be the good color. Additionally the application thread removes the color 1006 from the reference 1005 for storage in the call stack local variables 1032, as described above.

Figure 11:
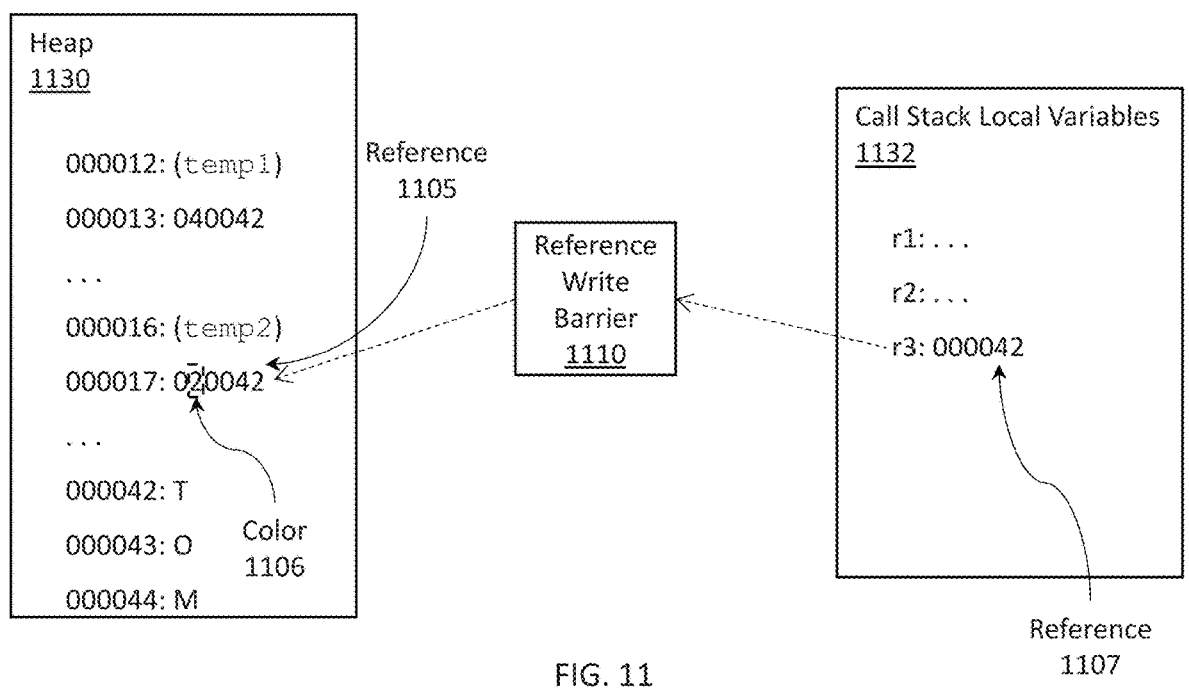
FIG. 11 illustrates a reference write barrier according to an embodiment.

FIG. 11 illustrates a reference write barrier according to an embodiment. As illustrated, a heap 1130 includes addresses 000012, 000013, . . . 000016, 000017, . . . 000042, 000043, 000044. Call stack local variables 1132 include registers r1, r2, r3. In the example, references include 24 bits. Colors of heap references may be indicated by bits 17-19. Where the color is M0, the hexadecimal value of bits 17-20 is 1 (or 0001 in binary). Where the color is M1, the hexadecimal value of bits 17-20 is 2 (or 0010 in binary). Where the color is R, the hexadecimal value of bits 17-20 is 4 (or 0100 in binary).

Sample code may include the following:

```
class Person {
    public String name;
    public static void main(String[ ] args) {
        Person temp1 = new Person( );
        Person temp2 = new Person( );
        ...
        String temp3 = temp1.name;
        temp2.name = temp3;
    }
}
```

Based on the code line Person temp2=new Person( ), an application thread creates a new object in a heap 1130, and a reference temp2 refers to the new object. The object (referred to by temp2) is of the type Person and includes a name field of the type String. The object (referred to by temp2) is stored at address "000016" within the heap 1130. The name field of the object (referred to by temp2) is stored at address "000017" within the heap 1130. The name field is populated with a reference 1105.

Based on the code line temp2.name=temp3, the application thread attempts to write a reference 1107 from call stack local variables 1132 into the heap 1130. In particular, the application thread attempts to write the reference 1107 to address "000017," the location where the name field for the object referred to by temp2 is stored.

In an embodiment, the reference 1107 stored on the call stack local variables 1132 complies with canonical form. Canonical form may require that certain bits, including bits 17-19, be a sign extension of a value stored at bits 1-16. Therefore bits 17-19 of the reference 1007 do not indicate any GC state.

The application thread hits a reference write barrier 1110. The reference write barrier 1110 includes instructions to add a color 1106 to the reference 1107. In particular, the application thread determines which color is currently the good color based on the bad bit mask and/or a current GC phase. Then the application thread tints the reference 1107 with the good color. Tinting the reference 1107 with the good color may include: (a) applying a logical bit-wise XOR (exclusive OR) operation to the bad bit mask and a value that includes a "1" for each bit corresponding to a color, and a "0" for all remaining bits, and (b) applying a logical bit-wise AND to the result of the XOR and the reference 1107 ("000042"). For example, a bad bit mask may be "050000." An XOR operation is applied to the bad bit mask "050000" and the value "070000." The result of the XOR is "020000." An OR operation is applied to the result "020000" and the reference "000042." The result of the OR is "020042." The application thread writes the result "020042" to the address "000017" in the heap 1130.

Figure 12:
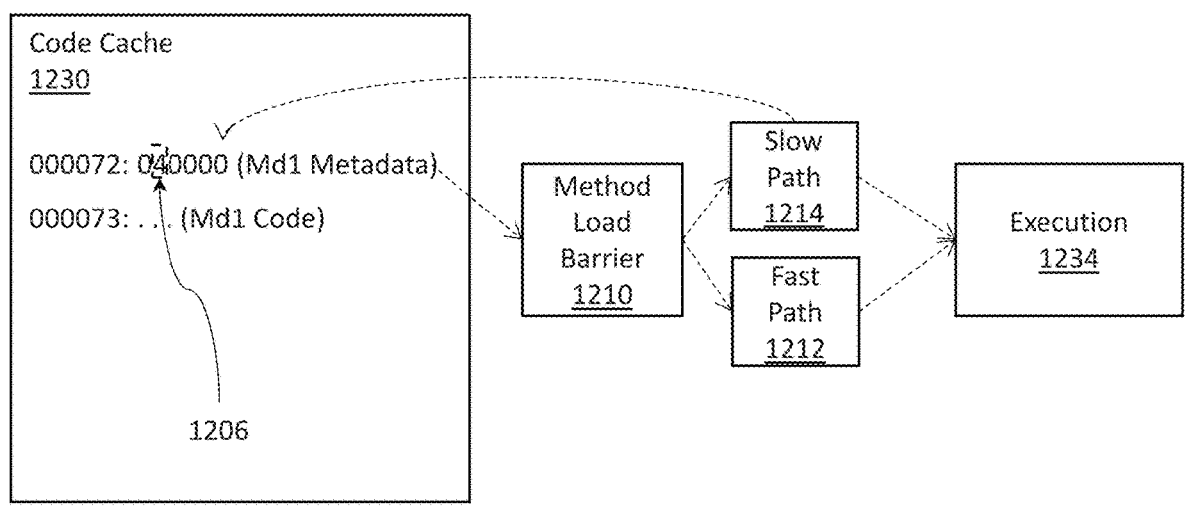
FIG. 12 illustrates a compiled method load barrier according to an embodiment.

FIG. 12 illustrates a compiled method load barrier according to an embodiment. As illustrated, a code cache 1230 includes addresses 000072, 000073. A compiled method Md1 is stored in the code cache 1230. Md1 Metadata is stored starting at address 000072. Md1 Code is stored starting at address 000073.

Md1 Metadata includes a field having the same number (or less) of bits as a reference. The metadata field includes an indication of a color 1206 associated with the compiled method Md1. In particular, the bits of the metadata field that indicate the color 1206 are the same as the bits of a heap reference that indicate a color of the heap reference. As an example, a total number of bits of a reference may be 24. A total number of bits of a metadata field including an indication of a color of a compiled method may be the same, that is, 24. Additionally, bits 17-19 of a heap reference may indicate a color of the heap reference. Similarly, bits 17-19 of a metadata field of a compiled method may indicate a color of the compiled method. Where the color is M0, the hexadecimal value of bits 17-20 of the metadata field is 1 (or 0001 in binary). Where the color is M1, the hexadecimal value of bits 17-20 is 2 (or 0010 in binary). Where the color is R, the hexadecimal value of bits 17-20 is 4 (or 0100 in binary).

The color 1206 of a compiled method Md1 is implicated to references embedded in Md1 Code. In an embodiment, references embedded in compiled methods comply with canonical form. Canonical form may require that certain bits, including bits 17-19, be a sign extension of a value stored at bits 1-16. Therefore bits 17-19 of reference embedded in Md1 Code do not indicate any color. However, the color of the embedded references is indicated by Md1 Metadata as the color 1206 of the compiled method Md1.

The application thread attempts to load the compiled method Md1. The application thread hits a compiled method load barrier 1210 (also referred to herein as a "method load barrier"). The method load barrier 1210 includes instructions to check whether the compiled method Md1 is of a good color. A logical bit-wise AND operation is applied to the Md1 Metadata and a bad bit mask. If the return value is 0, then the compiled method Md1 is of a good color. Otherwise, if the return value is not 0, the compiled method Md1 is not of a good color.

If the compiled method Md1 is of a good color, then the application thread takes a fast path 1212. The fast path 1212 does not necessarily involve any GC operations, such as remapping references and/or marking objects as live. The application thread may proceed to execution 1234 of the compiled method Md1.

If the compiled method Md1 is not of a good color, then the application thread takes a slow path 1214. The application thread may select one of a candidate set of slow paths, based a current color 1206 indicated by the Md1 Metadata. The application thread iterates a set of GC operations with respect to each reference embedded in the Md1 Code. The application thread may, for example, remap addresses indicated by the embedded references. The application may, for example, mark objects pointed to by the embedded references as live. Then the application thread updates the color 1206 of the compiled method Md1 to be the good color. The application thread may then proceed to execution 1234 of the compiled method Md1. Execution 1234 uses references that may have been remapped as part of the slow path 1214.

Execution 1234 of the compiled method Md1 includes dereferencing references embedded in Md1 Code. The embedded references do not necessarily include any indication of color.

5. Marking a Heap Reference by a Garbage Collection Thread

Figure 13:
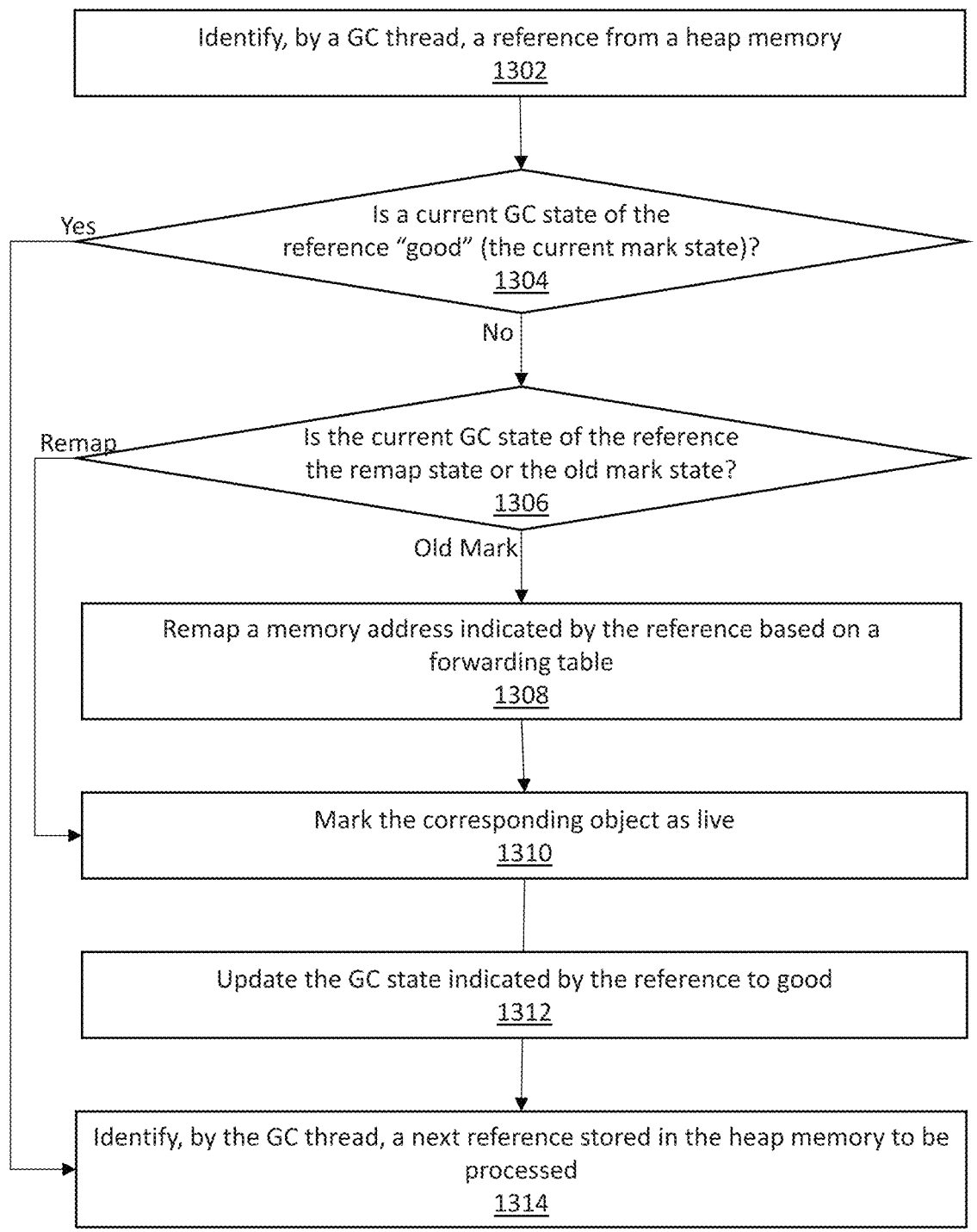
FIG. 13 illustrates a set of operations for marking a heap reference by a garbage collection thread according to an embodiment.

FIG. 13 illustrates a set of operations for marking a heap reference by a garbage collection thread according to an embodiment. One or more operations illustrated in FIG. 13 may be modified, rearranged, or omitted all together. Accordingly, the particular sequence of operations illustrated in FIG. 13 should not be construed as limiting the scope of one or more embodiments. The operations as illustrated in FIG. 13 does not limit the way the operations are expressed in a set of code. Multiple operations of FIG. 13 may correspond to a single instruction in a set of code; conversely, a single operation of FIG. 13 may correspond to multiple instructions in a set of code. The operations of FIG. 13 are described as being executed by a single GC thread; however, the operations may be executed by multiple GC threads executing in parallel.

One or more embodiments include identifying, by a GC thread, a reference from a heap memory (Operation 1302). During a marking phase (such as Mark/Remap 704 of FIG. 7) of a GC cycle, a GC thread identifies a reference from a heap memory. The reference may be identified as part of a traversal of an object graph.

One or more embodiments include determining whether a current GC state of the reference is "good" (that is, the current mark state) (Operation 1304). Since marking is performed only in an M0 or M1 window, the good GC state is either M0 or M1, and cannot be Remap. If the good GC state is M0, then M0 is referred to as the "current mark state," and M1 is the "old mark state." If the good GC state is M1, then M1 is referred to as the "current mark state," and M0 is the "old mark state."

Since a current GC state of the reference is indicated by the reference, the GC thread analyzes the reference itself to determine whether the current GC state is good. In an example, a bad bit mask is used. The bad bit mask has 1's only in the bit positions corresponding to bad colors, and 0's in all remaining bits. The GC thread applies a logical bit-wise AND operation to the reference and the bad bit mask. If the result is 0, then the current GC state of the reference is good. If the result is not 0, then the current GC state of the reference is not good. Other methods for checking a current GC state of a reference may be used.

If the current GC state is good, one or more embodiments include identifying a next reference stored in the heap memory to be processed (Operation 1314). The GC thread takes a "fast path," which involves skipping GC Operations, such as remapping a reference, marking an object as live, and/or updating a GC state of a reference (for example, Operations 1308-1312). The GC thread directly executes Operation 1314, which is further discussed below.

If the current GC state of the reference is not good, one or more embodiments include determining whether the current GC state of the reference is the remap state or the old mark state (Operation 1308). The GC thread analyzes the reference to determine whether a current GC state of the reference is the remap state or the old mark state. The GC selects one of a candidate set of slow paths based on the current GC state.

If the current GC state is the old mark state, one or more embodiments include (1) remapping a memory address indicated by the reference based on a forwarding table, (2) marking the corresponding object as live, and (3) updating the GC state indicated by the reference to good (Operations 1308-1312). The old mark state indicates that the reference may be stale. The GC thread checks whether the corresponding object was relocated during the Relocation phase (for example, Relocation 712 of FIG. 7) in the immediately-preceding GC cycle. If the corresponding object was not relocated, no remapping is needed. If the corresponding object was relocated, then the GC thread consults a forwarding table. Based on the forwarding table, the GC thread determines a new location of the corresponding object. The GC thread updates the reference to point to the new location.

Additionally, the GC thread marks the object, pointed to by the reference, as live. In an example, one or more particular bits within metadata of the object may indicate liveness of the object. The GC thread may set the particular bits to indicate that the object is live. In another example, one or more external bitmaps are used to indicate liveness of the object. During the upcoming Relocation phase (such as Relocation 712 of FIG. 7) in the same GC cycle, the GC thread identifies and relocates objects that have been marked as live. The GC thread does not relocate objects that have not been marked as live.

Additionally, the GC thread updates the GC state indicated by the reference to good, that is, the current mark state.

If the current GC state of the reference is the remap state, one or more embodiments include (1) marking the corresponding object as live, and (2) updating the GC state indicated by the reference to good (Operations 1310-1312). The remap state indicates that the reference is not stale—either the reference has been remapped to point to a new location of the corresponding object, or the reference need not be remapped because the corresponding object was not relocated during the previous Relocation phase. Therefore, the GC operation of remapping the reference (for example, Operation 1308) is skipped.

The GC thread marks the object, pointed to by the reference, as live. Additionally, the GC thread updates the GC state indicated by the reference to good, that is, the current mark state.

One or more embodiments include identifying, by the GC thread, a next reference stored in the heap memory to be processed (Operation 1314). The GC thread determines whether there are any other references to be processed. If yes, then the GC thread iterates Operations 1302-1312 with respect to the next reference. If there are no other references to be processed, then marking ends (for example, the GC process moves from Mark/Remap 704 to Mark End 706 of FIG. 7).

6. Loading a Heap Reference by an Application Thread

Figure 14:
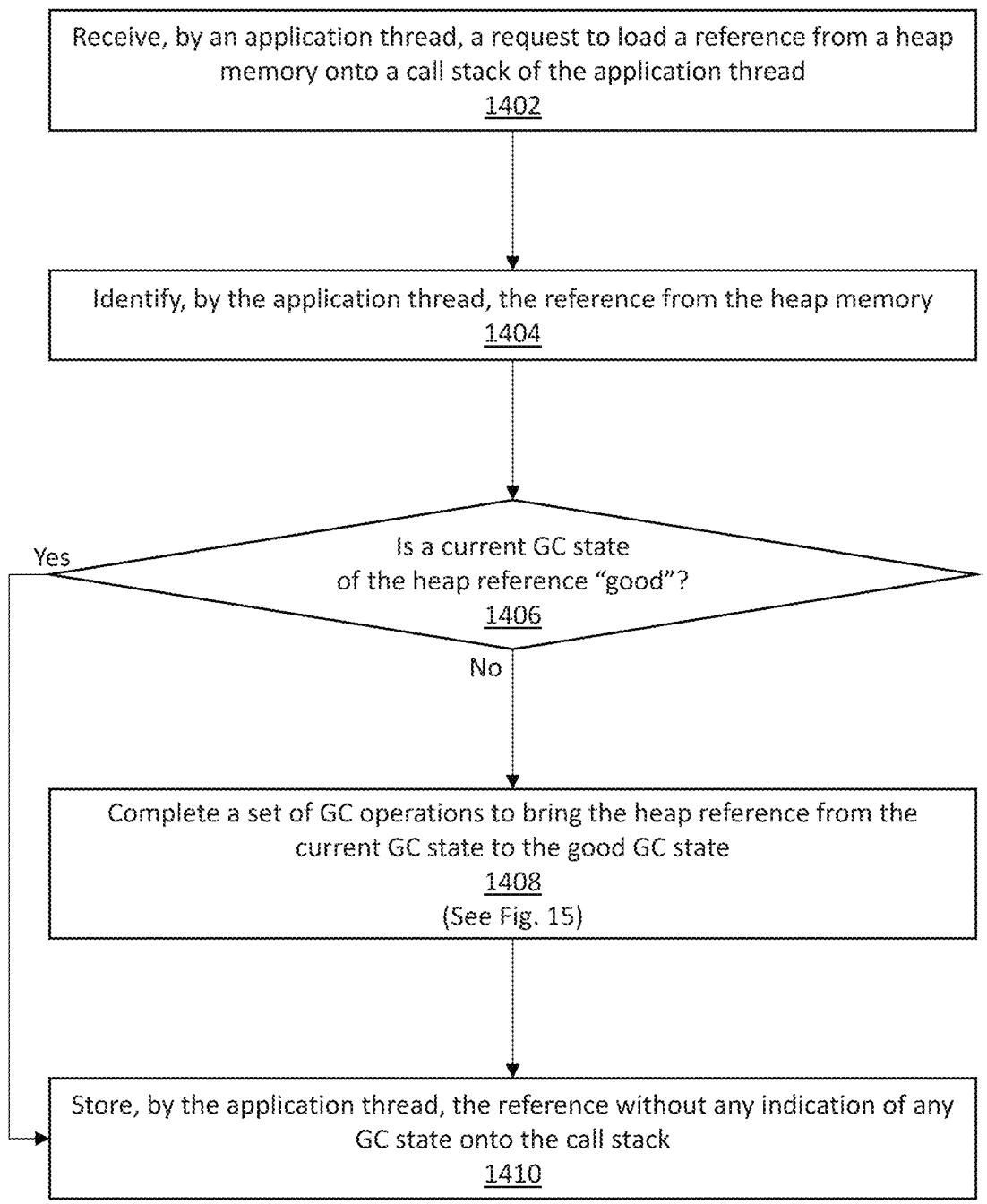
FIG. 14 illustrates a set of operations for loading a heap reference by an application thread according to an embodiment.

FIG. 14 illustrates a set of operations for loading a heap reference by an application thread according to an embodiment. One or more operations illustrated in FIG. 14 may be modified, rearranged, or omitted all together. Accordingly, the particular sequence of operations illustrated in FIG. 14 should not be construed as limiting the scope of one or more embodiments. The operations as illustrated in FIG. 14 does not limit the way the operations are expressed in a set of code. Multiple operations of FIG. 14 may correspond to a single instruction in a set of code; conversely, a single operation of FIG. 14 may correspond to multiple instructions in a set of code. The operations of FIG. 14 are described as being executed by a single application thread; however, the operations may be executed by multiple application threads and/or GC threads.

One or more embodiments include receiving, by an application thread, a request to load a reference from a heap memory onto a call stack of the application thread (Operation 1402). During a concurrent phase of a GC system (for example, Mark/Remap 704, Evacuation Selection 708, or Relocation 712 of FIG. 7), an application thread executes a set of code (for example, bytecode). The set of code includes a request to load a reference from a heap memory onto a call stack of the application thread.

One or more embodiments include identifying, by the application thread, the reference from the heap memory (Operation 1404). The application thread identifies the reference from the heap memory (referred to herein as the "heap reference").

One or more embodiments include determining whether a current GC state of the heap reference is "good." (Operation 1406). Rather than directly storing the reference onto the call stack, the application thread first hits a load barrier. The application thread checks whether a current GC state of the heap reference is "good." The application thread analyzes the heap reference to determine whether the current GC state of the heap reference is good. Examples of operations for determining whether a current GC state of a heap reference is good are described above with reference to Operation 1304 of FIG. 13.

In an embodiment, the heap reference is not directly dereferenced. Therefore, the heap reference need not necessarily comply with any dereferencing prerequisites (such as compliance with canonical form). Therefore, the indication of the current GC state, as included in the heap reference, does not necessarily comply with canonical form. The indication of the current GC state may be stored, for example, in a non-addressable portion of the heap reference.

If the current GC state is good, one or more embodiments include storing the reference without any indication of any GC state onto the call stack (Operation 1410). The application thread takes a "fast path," which involves skipping GC operations, such as remapping a reference, marking an object as live, and/or updating a GC state of a reference (for example, GC operations illustrated in FIG. 15). The application thread directly executes Operation 1410, which is further discussed below.

If the current GC state is not good, one or more embodiments include completing a set of GC operations to bring the heap reference from the current GC state to the good GC state (Operation 1408). The application thread selects one of a candidate set of slow paths based on the good GC state and the current GC state of the heap reference.

Referring to FIG. 15, FIG. 15 illustrates a set of paths for bringing a heap reference from a current garbage collection state to a good garbage collection state according to an embodiment. Table 1500 indicates a matrix of current GC states and good GC states.

If the good GC state is the current mark state (M0 or M1), and the current GC state of the heap reference is the current mark state, then there are no GC operations to perform. The path taken is referred to as a "fast path."

Comparing with FIG. 13, where the good GC state is the current mark state, and the current GC state of the reference is the current mark state, both (a) an application thread loading a reference from a heap memory to a call stack, and (b) a GC thread marking a reference in the heap memory take the fast path. The fast path does not necessarily involve any reference remapping, object marking, and/or GC state updating.

If the good GC state is the current mark state (M0 or M1), and the current GC state of the heap reference is the remap state, then the operations to be performed include: (1) marking the corresponding object as live, and (2) updating the GC state indicated by the heap reference to good (that is, the current mark state).

Comparing with FIG. 13, where the good GC state is the current mark state (M0 or M1), and the current GC state of the heap reference is the remap state, both (a) an application thread loading a reference from a heap memory to a call stack, and (b) a GC thread marking a reference in the heap memory take a similar slow path (see Operations 1310-1312 of FIG. 13).

If the good GC state is the current mark state (M0 or M1), and the current GC state of the reference is the old mark state, then the operations to be performed include: (1) remapping the reference to a new address, if needed, (2) marking the corresponding object as live, and (3) updating the GC state indicated by the heap reference to good (that is, the current mark state).

Comparing with FIG. 13, where the good GC state is the current mark state (M0 or M1), and the current GC state of the reference is the old mark state, both (a) an application thread loading a reference from a heap memory to a call stack, and (b) a GC thread marking a reference in the heap memory take a similar slow path (see Operations 1308-1312 of FIG. 13).

If the good GC state is the remap state, and the current GC state of the reference is the current mark state, then the operations to be performed include: (1) remapping the reference to a new address, if needed, and (2) updating the GC state indicated by the heap reference to good (that is, the remap state).

If the good GC state is the remap state, and the current GC state of the reference is the remap state, then there are no GC operations to perform. The path taken is referred to as a "fast path."

One or more embodiments include storing, by the application thread, the reference without any indication of any GC state onto the call stack (Operation 1410). The application thread removes any indication of any GC state from the heap reference. In an example, a color removal mask is used. The color removal mask has "0" for each bit that indicates a color (for example, the M0, M1, and R bits), and "1" for each remaining bit. Removing any indication of any GC state may include applying a logical bit-wise AND operation to the heap reference and the color removal mask. The application thread stores the result of the AND operation to the call stack. Meanwhile, the heap reference, with the indication of the GC state, continues to be stored in the heap memory.

In some embodiments, the reference stored onto the call stack has no indication of GC state. The reference on the call stack does not include any information on a progress of GC operations with respect to the reference. In particular, a heap reference includes (a) a first set of bits that indicates an address of the corresponding object, and (b) a second set of bits that indicates one or more GC states. A reference stored on a call stack includes (a) the same first set of bits that indicates the same address of the same corresponding object, and (b) the same second set of bits, but the second set of bits do not indicate any GC state.

In other embodiments, the reference stored onto the call stack has no indications of which of a mutually exclusive set of GC states (for example, M0, M1, and R) is associated with the reference. However, the reference on the call stack may indicate other GC states (for example, an age of the reference). In particular, a heap reference includes (a) a first set of bits that indicates an address of the corresponding object, (b) a second set of bits that indicates one of a mutually exclusive set of GC states associated with the heap reference, and (c) a third set of bits that indicates one or more other GC states. A reference stored on a call stack includes (a) the same first set of bits that indicates the same address of the same corresponding object, (b) the same second set of bits, but the second set of bits do not indicate any of the mutually exclusive set of GC states as being associated with the reference, and (c) the same third set of bits that indicates the same other GC states.

In an embodiment, the application thread attempts to dereference the reference that was stored on the call stack based on Operation 1410. As described above, in some embodiments, a hardware system (such as a processor) upon which the application thread executes requires that a non-addressable portion of a reference comply with canonical form before being dereferenced. Hence, prior to dereferencing (if dereferencing is performed), the processor verifies whether the reference complies with canonical form. Even if the indication of the GC state included in the heap reference violates canonical form, the indication has been removed from the reference on the call stack. Therefore the processor determines that the reference on the call stack complies with canonical form. The application thread thereby successfully dereferences the reference on the call stack.

7. Writing a Heap Reference by an Application Thread

Figure 16:
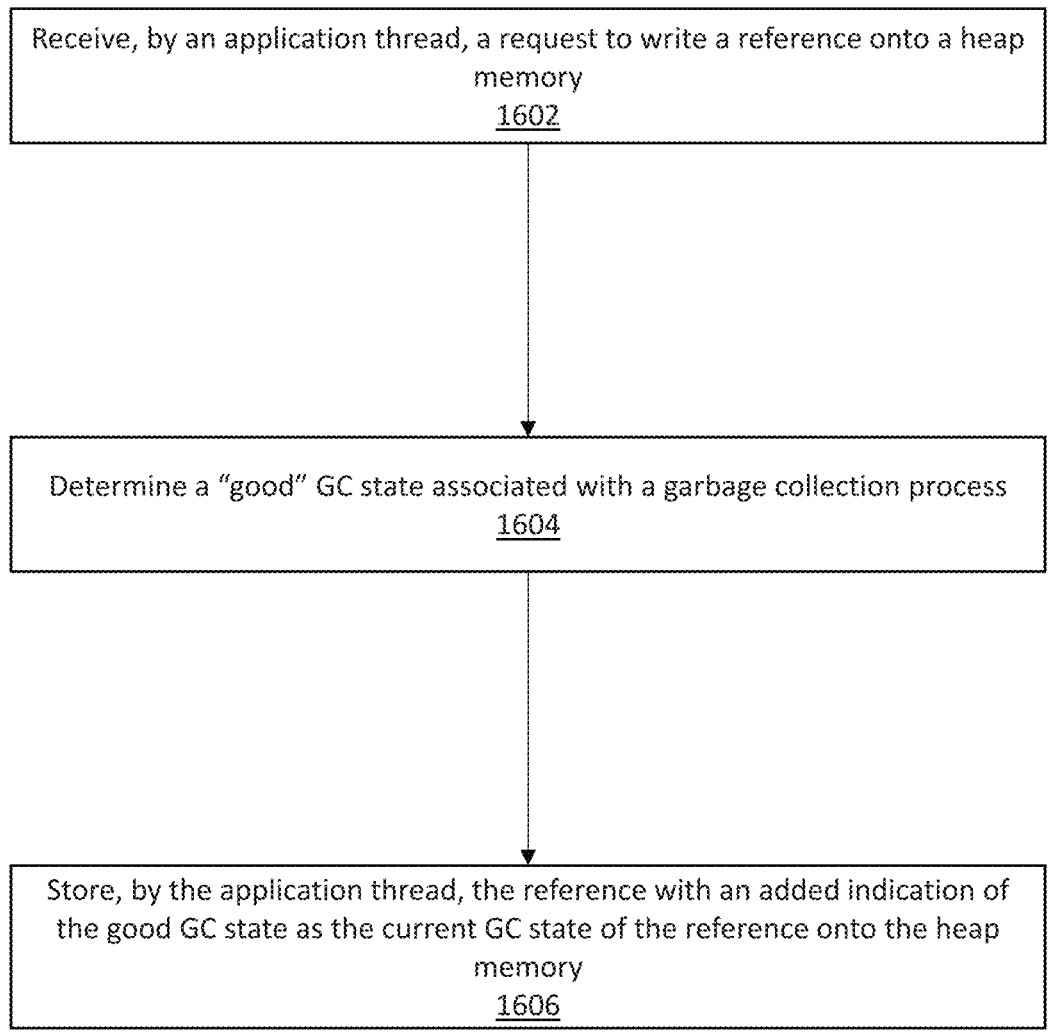
FIG. 16 illustrates a set of operations for writing a heap reference by an application thread according to an embodiment.

FIG. 16 illustrates a set of operations for writing a heap reference by an application thread according to an embodiment. One or more operations illustrated in FIG. 16 may be modified, rearranged, or omitted all together. Accordingly, the particular sequence of operations illustrated in FIG. 16 should not be construed as limiting the scope of one or more embodiments. The operations as illustrated in FIG. 16 does not limit the way the operations are expressed in a set of code. Multiple operations of FIG. 16 may correspond to a single instruction in a set of code; conversely, a single operation of FIG. 16 may correspond to multiple instructions in a set of code. The operations of FIG. 16 are described as being executed by a single application thread; however, the operations may be executed by multiple application threads and/or GC threads.

One or more embodiments include receiving, by an application thread, a request to write a reference onto a heap memory (Operation 1602). An application thread executes a set of code (for example, bytecode). The set of code includes a request to write a reference onto a heap memory. The request may be, for example, to write a reference stored on a call stack of the application thread onto a heap memory.

In an embodiment, the reference does not have any indication of which GC state is a current GC state of the reference. The reference does not include any information or metadata indicating a progress of GC operations with respect to the reference. In another embodiment, the reference does not have any indication of which of a set of mutually exclusive GC states (for example, M0, M1, and R) is a current GC state of the reference; however, the reference may include information on other GC states (for example, an age of the reference).

In an embodiment, the reference to be written may have been previously dereferenced (by the application thread currently attempting to write the reference to the heap memory and/or another thread). As described above, in some embodiments, a hardware system (such as a processor) upon which the application thread executes requires that a non-addressable portion of a reference comply with canonical form before being dereferenced. Hence, prior to dereferencing (if dereferencing was previously performed), the processor performed a verification on whether the reference complied with canonical form. In order for the verification to have passed, the reference must not include any indication of GC state in the non-addressable portion. In some cases, the reference lacks indication of GC state in the non-addressable portion because the indication of GC state was removed based on the operations of FIG. 14.

One or more embodiments include determining a "good" GC state associated with a GC process (Operation 1604). The application thread determines a "good" GC state associated with a GC process. In an embodiment, the application thread obtains a current bad bit mask. The application thread applies a logical bit-wise XOR operation to the bad bit mask and a value that includes "1" for each bit corresponding to a color and a "0" for all remaining bits (for example, 070000 in hexadecimal). The result of the XOR may be referred to as a "good bit mask." The good bit mask includes a "1" in the bit representing the good GC state, and "0" for the remaining bits. Additional and/or alternative operations for determining a good GC state may be used.

One or more embodiments include storing, by an application thread, the reference with an added indication of the good GC state as the current GC state of the reference onto the heap memory (Operation 1606). The application thread adds an indication of the good GC state as the current GC state of the reference. The application stores, onto the heap memory, the reference that includes the indication of the current GC state of the reference. In an embodiment, the application thread applies a logical bit-wise OR operation to the good bit mask and the reference. The result of the OR operation is the reference with an indication of the good GC state as the current GC state of the reference. The result of the OR operation is stored onto the heap memory.

In an embodiment, the reference stored on the heap is not directly dereferenced. Therefore, the heap reference need not necessarily comply with any dereferencing prequisites (such as compliance with canonical form). Therefore, the heap reference may include an indication of a GC state, even if that indication violates canonical form. The indication of the GC state may be stored in, for example, a non-addressable portion of the heap reference.

In an embodiment, the indication of the GC state is used in subsequent accesses to the heap reference. As an example, a GC thread performing a marking phase may identify the heap reference. The GC thread may select a path to be taken with respect to the heap reference based on the GC state indicated by the reference. As another example, an application thread may load the heap reference. The application thread may hit a load barrier. Within the load barrier, the application thread may select a path to be taken with respect to the heap reference based on the GC state indicated by the reference (using, for example, the operations of FIG. 15). After performing the selected path, the application thread may load the heap reference.

8. Loading a Compiled Method by an Application Thread

Figure 17:
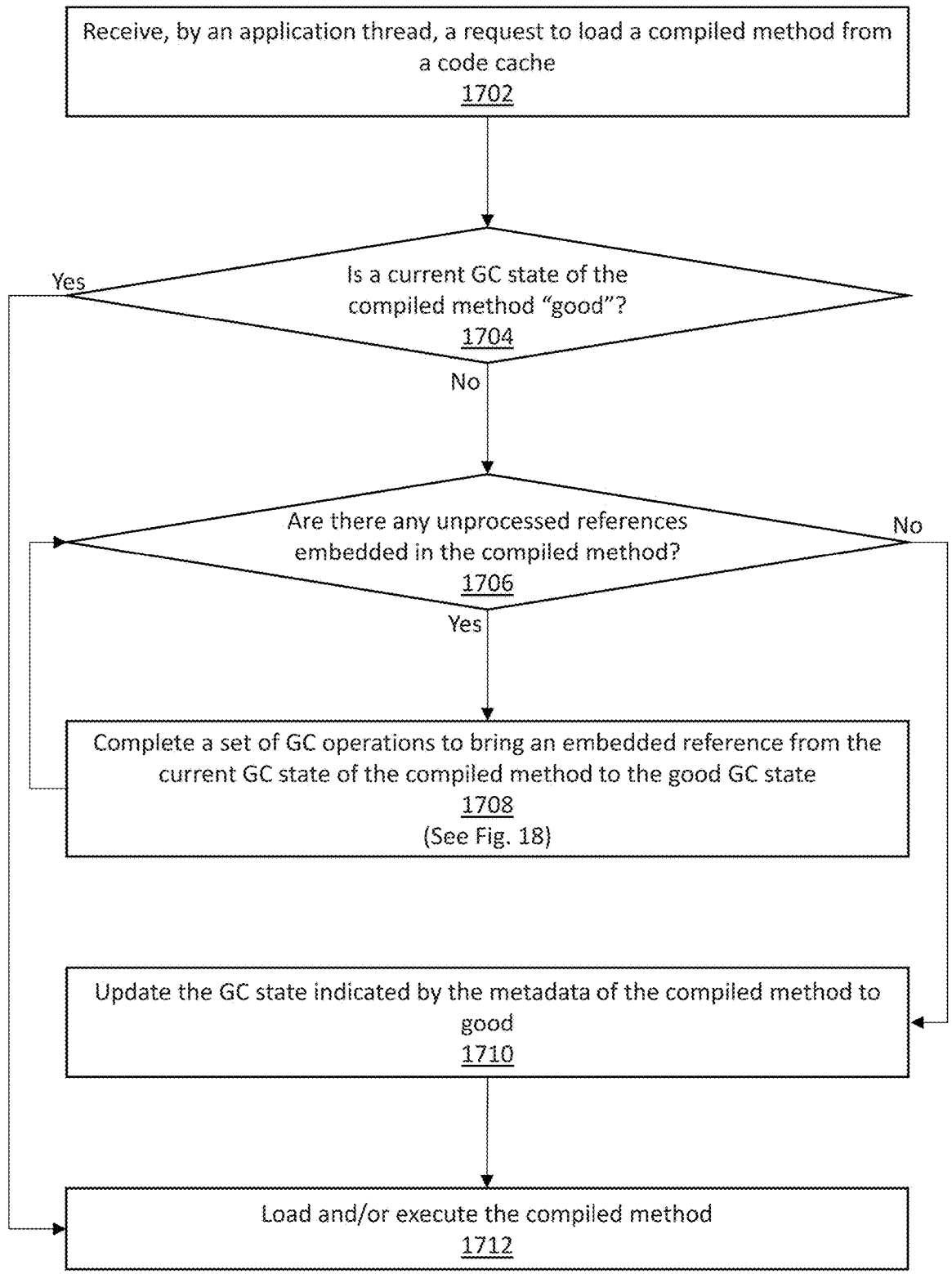
FIG. 17 illustrates a set of operations for loading a compiled method by an application thread according to an embodiment.

FIG. 17 illustrates a set of operations for loading a compiled method by an application thread according to an embodiment. One or more operations illustrated in FIG. 17 may be modified, rearranged, or omitted all together. Accordingly, the particular sequence of operations illustrated in FIG. 17 should not be construed as limiting the scope of one or more embodiments. The operations as illustrated in FIG. 17 does not limit the way the operations are expressed in a set of code. Multiple operations of FIG. 17 may correspond to a single instruction in a set of code; conversely, a single operation of FIG. 17 may correspond to multiple instructions in a set of code. The operations of FIG. 17 are described as being executed by a single application thread; however, the operations may be executed by multiple application threads and/or GC threads.

One or more embodiments include receiving, by an application thread, a request to load a compiled method from a code cache (Operation 1702). An application thread executes a set of code (for example, bytecode). The set of code includes an invocation to a compiled method stored in a code cache.

One or more embodiments include determining whether a current GC state of the compiled method is "good" (Operation 1704). Rather than directly loading and/or executing the compiled method, the application thread hits a load barrier. Since a current GC state of the compiled method is indicated by a metadata field, the GC thread analyzes the metadata field of the compiled method to determine whether the current GC state is good. The metadata field of the compiled method may be in the code cache. Additionally, the metadata field of the compiled method may be stored immediately preceding the code of the compiled method.

In an embodiment, the bits within a heap reference that indicate a current GC state of the heap reference are the same bits within a metadata field associated with a compiled method that indicate a current GC state of the compiled method. Hence, operations for determining whether a current GC state of a heap reference is good may be applied for determining whether a current GC state of a compiled method is good.

In an example, as explained above, a bad bit mask may be used in determining whether a reference is of a good GC state. Applying a logical bit-wise AND operation to the bad bit mask and a heap reference of a good GC state would result in all 0's. Applying a logical bit-wise AND operation to the bad bit mask and a heap reference that is not of a good GC state would not result in all 0's. Similarly, an application thread may apply a logical bit-wise AND operation to the bad bit mask and a metadata field associated with a compiled method. If the result is all 0's, then the current GC state of the compiled method is good. If the result is not all 0's, then the current GC state of the compiled method is not good. Other methods for checking a current GC state of a compiled method may be used.

If the current GC state is good, one or more embodiments include loading and/or executing the compiled method (Operation 1712). The application thread takes a "fast path," which involves skipping GC operations, such as remapping a reference and/or marking an object as live (for example, GC operations illustrated in FIG. 18). The application thread directly executes Operation 1712, which is further discussed below.

If the current GC state is not good, one or more embodiments include determining whether there are any unprocessed references embedded in the compiled method (Operation 1706). The application thread determines whether there are any references embedded in the compiled method that have not yet been processed based on Operation 1708. In an embodiment, the application thread traverses through the code of the compiled method to determine whether the code includes any embedded references. In a first iteration, the traversal may begin with the beginning of the code. In a next iteration, the traversal may begin with a location of the embedded reference that was most recently found and/or most recently processed. If the application thread finds an embedded reference, the application proceeds to process the embedded reference based on Operation 1708. If the application reaches the end of the code without finding any embedded references, then the code does not include any unprocessed references.

One or more embodiments including completing a set of GC operations to bring an embedded reference from the current GC state of the compiled method to the good GC state (Operation 1708). The application thread selects one of a candidate set of slow paths for processing an embedded reference identified at Operation 1706. The application thread selects a slow path based on the good GC state and the current GC state of the compiled method, which by implication is also the current GC state of the embedded reference.

Figure 18:
FIG. 18 illustrates a set of paths for bringing an embedded reference from a current garbage collection state to a good garbage collection state according to an embodiment.

Referring to FIG. 18, FIG. 18 illustrates a set of paths for bringing an embedded reference from a current GC state to a good GC state according to an embodiment. Similar to table 1500 of FIG. 15 above, table 1800 indicates a matrix of current GC states and good GC states. In the context of loading compiled methods, the "current GC state" of table 1800 refers to the GC state of the embedded reference, as implicated from the GC state of the compiled method, which is indicated by a metadata field associated with the compiled method.

If the good GC state is the current mark state (M0 or M1), and the current GC state of the embedded reference is the current mark state, then there are no GC operations to perform. The path taken is referred to as a "fast path."

If the good GC state is the current mark state (M0 or M1), and the current GC state of the embedded reference is the remap state, then the operations to be performed include: marking the corresponding object as live.

If the good GC state is the current mark state (M0 or M1), and the current GC state of the reference is the old mark state, then the operations to be performed include: (1) remapping the reference to a new address, if needed, and (2) marking the corresponding object as live.

If the good GC state is the remap state, and the current GC state of the reference is the current mark state, then the operations to be performed include: remapping the reference to a new address, if needed.

If the good GC state is the remap state, and the current GC state of the reference is the remap state, then there are no GC operations to perform. The path taken is referred to as a "fast path."

Comparing table 1500 and table 1800, the various paths in the matrix are similar, except that table 1800 does not include any operation for updating the GC state of the reference. None of the possible set of paths to take when loading a compiled method involves updating the GC state of the embedded reference since embedded references do not include any indication of any GC state.

In some embodiments, the possible paths to take when loading a compiled method do not involve updating the GC state of an embedded reference to indicate one of a mutually exclusive set of GC states (such as M0, M1, and R); but one or more paths may include updating other GC states (for example, an age of the reference) of the embedded reference. Embedded references do not include any indication of any of the mutually exclusive set of GC states; but embedded references may include other GC states or other information related to a progress of GC operations with respect to the embedded references.

After completing the set of GC operations at Operation 1708, the application thread iterates Operation 1706 to determine whether there are any unprocessed references embedded in the compiled method. Hence, the application thread hence iterates Operation 1708 with respect to each reference embedded in the compiled method. The same path within table 1800 is taken with respect to each reference embedded in the compiled method to bring each reference from the current GC state to the good GC state.

If the compiled method does not include any further unprocessed embedded references, one or more embodiments include updating the GC state indicated by the metadata of the compiled method to good (Operation 1710). The application thread updates the GC state indicated by the metadata field of the compiled method to good. If the good GC state is the current mark state, the application thread updates the GC state indicated by the metadata field of the compiled method to be the current mark state. If the good GC state is the remap state, the application thread updates the GC state indicated by the metadata field of the compiled method to be the remap state.

One or more embodiments include loading and/or executing the compiled method (Operation 1712). The application thread loads the compiled method. Additionally or alternatively, the application thread executes the compiled method. Executing the compiled method may include dereferencing references embedded in the compiled method. As described above, in some embodiments, a hardware system (such as a processor) upon which the application thread executes requires that a non-addressable portion of a reference comply with canonical form before being dereferenced. Hence, prior to dereferencing (if dereferencing is performed), the processor verifies whether each embedded reference complies with canonical form. In order for the verification to pass, each embedded reference must not include any indication of GC state in the non-addressable portion. Yet the embedded references need not include any indication of GC state in the non-addressable portion, because indication of that GC state is stored instead in the metadata of the compiled method. Therefore the processor determines that the embedded references comply with canonical form. The application thread thereby successfully proceeds with dereferencing the embedded references.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

10. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 19:
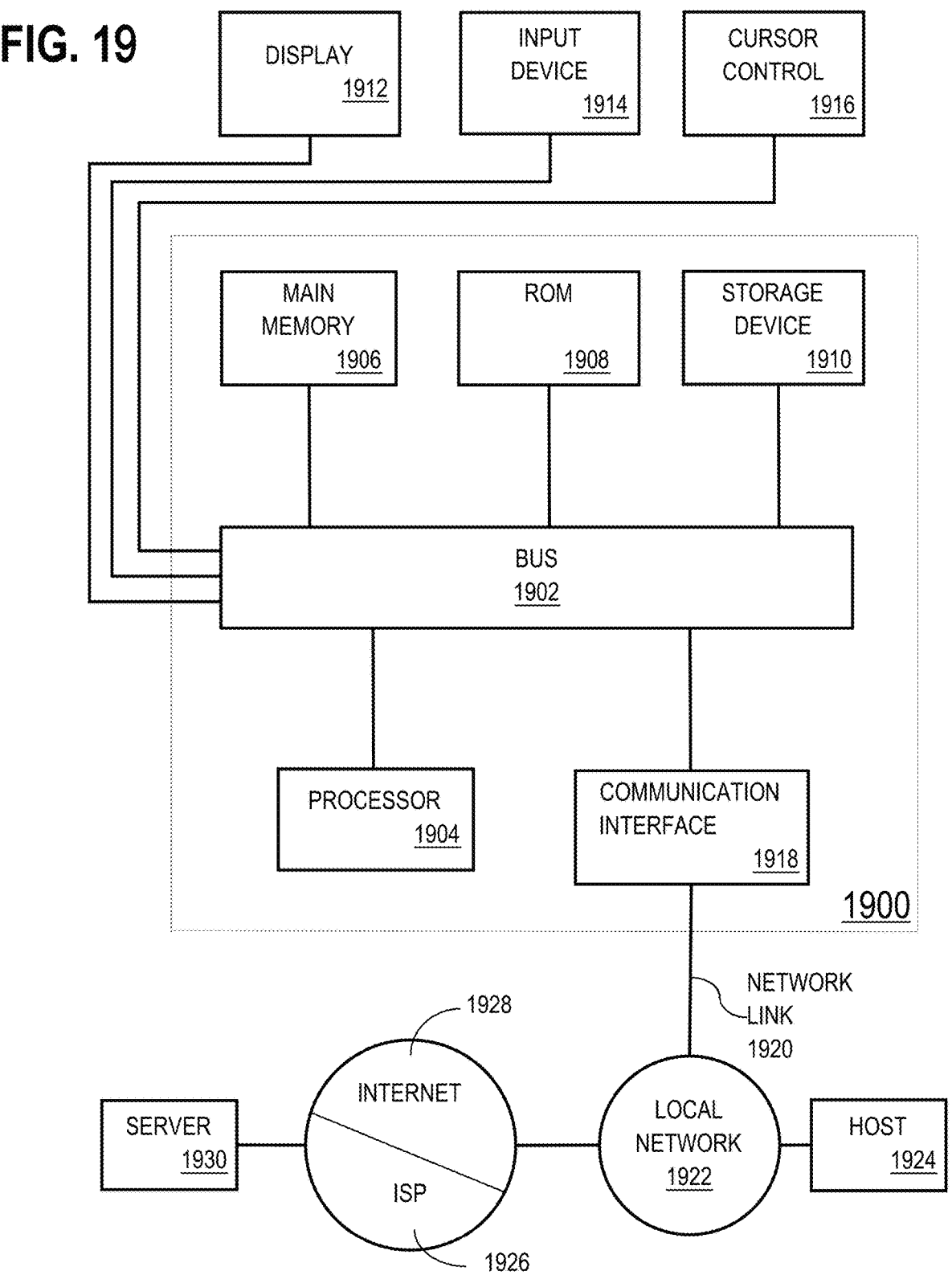
FIG. 19 illustrates a system in accordance with one or more embodiments.

For example, FIG. 19 is a block diagram that illustrates a computer system 1900 upon which an embodiment of the invention may be implemented. Computer system 1900 includes a bus 1902 or other communication mechanism for communicating information, and a hardware processor 1904 coupled with bus 1902 for processing information. Hardware processor 1904 may be, for example, a general purpose microprocessor.

Computer system 1900 also includes a main memory 1906, such as a random access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Such instructions, when stored in non-transitory storage media accessible to processor 1904, render computer system 1900 into a special-purpose machine that is customized to perform the operations specified in the instructions.

Computer system 1900 further includes a read only memory (ROM) 1908 or other static storage device coupled to bus 1902 for storing static information and instructions for processor 1904. A storage device 1910, such as a magnetic disk or optical disk, is provided and coupled to bus 1902 for storing information and instructions.

Computer system 1900 may be coupled via bus 1902 to a display 1912, such as a cathode ray tube (CRT), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

Computer system 1900 may implement the techniques described herein using customized hard-wired logic, one or more ASICs or FPGAs, firmware and/or program logic which in combination with the computer system causes or programs computer system 1900 to be a special-purpose machine. According to one embodiment, the techniques herein are performed by computer system 1900 in response to processor 1904 executing one or more sequences of one or more instructions contained in main memory 1906. Such instructions may be read into main memory 1906 from another storage medium, such as storage device 1910. Execution of the sequences of instructions contained in main memory 1906 causes processor 1904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1910. Volatile media includes dynamic memory, such as main memory 1906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1902. Transmission media can also take the form of acoustic or light waves, such as those generated during radio-wave and infra-red data communications.

Various forms of media may be involved in carrying one or more sequences of one or more instructions to processor 1904 for execution. For example, the instructions may initially be carried on a magnetic disk or solid state drive of a remote computer. The remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card, cable modem, satellite modem, or a modem to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are example forms of transmission media.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918.

The received code may be executed by processor 1904 as it is received, and/or stored in storage device 1910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   receiving a request, by an application thread, to load a first reference to a first object from a heap memory onto a call stack of the application thread;
   retrieving the first reference from the heap memory, wherein the first reference includes (a) a first memory address in the heap memory at which the first object is stored during at least a first time period and (b) an indication of a first garbage collection state, of a plurality of garbage collection states, associated with the first reference;
   wherein a respective garbage collection state, of the plurality of garbage collection states, indicates a progress of garbage collection operations with respect to each of a plurality of references stored in the heap memory;
   generating a second reference from the first reference at least by removing the indication of the first garbage collection state from the first reference;
   storing the second reference, without any indication of any of the plurality of garbage collection states, onto the call stack.

2. The one or more media of claim 1, further storing instructions which cause:
   based on the first garbage collection state associated with the first reference: selecting a path, from a plurality of paths, to be executed with respect to the first reference;
   wherein at least one path of the plurality of paths comprises updating the first reference to indicate that a second garbage collection state, of the plurality of garbage collection states, is associated with the first reference.

3. The one or more media of claim 2, wherein at least one other path of the plurality of paths does not comprise making any change to the first reference to indicate that a different garbage collection state, of the plurality of garbage collection states, is associated with the first reference.

4. The one or more media of claim 1, further storing instruction which cause:
   updating the first reference to indicate that a second garbage collection state, of the plurality of garbage collection states, is associated with the first reference;
   subsequent to updating the first reference: receiving a second request, by the application thread, to load the first reference from the first object from the heap memory onto the call stack of the application thread;
   based on the second garbage collection state associated with the first reference: selecting a path, from a plurality of paths, to be executed with respect to the first reference.

5. The one or more media of claim 1, further storing instruction which cause:
   updating the first reference to indicate that a second garbage collection state, of the plurality of garbage collection states, is associated with the first reference;
   subsequent to updating the first reference: identifying, by a garbage collection thread, the first reference;
   based on the second garbage collection state associated with the first reference: selecting a path, from a plurality of paths, to be executed with respect to the first reference;
   wherein at least one path of the plurality of paths comprises updating the first reference to indicate that the first garbage collection state is associated with the first reference.

6. The one or more media of claim 1, further storing instructions which cause:
   based on the first garbage collection state associated with the first reference: selecting a path, from a plurality of paths, to be executed with respect to the first reference;
   wherein at least one path of the plurality of paths comprises remapping the first reference to replace the first memory address with a second memory address in the heap memory at which the first object is stored during at least a second time period.

7. The one or more media of claim 1, further storing instructions which cause:
   based on the first garbage collection state associated with the first reference: selecting a path, from a plurality of paths, to be executed with respect to the first reference;
   wherein at least one path of the plurality of paths comprises marking the first object as live.

8. The one or more media of claim 1, further storing instructions which cause:
   determining a good garbage collection state, of the plurality of garbage collection states, based on a current phase of a current garbage collection cycle performed by a garbage collection thread;
   based on the good garbage collection state and the first garbage collection state associated with the first reference: selecting a path, from a plurality of paths, to be executed with respect to the first reference;
   executing the selected path with respect to the first reference.

9. The one or more media of claim 1, wherein the second reference includes one of:
   the first memory address in the heap memory at which the first object is stored during at least the first time period; or
   a second memory address, rather than the first memory address, in the heap memory at which the first object is stored during at least a second time period.

10. The one or more media of claim 1, wherein the indication of the first garbage collection state associated with the first reference is stored in a non-addressable portion of the first reference.

11. The one or more media of claim 1, further storing instructions which cause:
    dereferencing the second reference.

12. The one or more media of claim 1, further storing instructions which cause:
    prior to dereferencing the second reference: verifying that the second reference complies with canonical form;
    wherein the first reference including the indication of the first garbage collection state does not comply with the canonical form.

13. The one or more media of claim 1, wherein a first set of bits within the first reference comprises the indication of the first garbage collection state associated with the first reference, and the same first set of bits of the second reference comprises a sign extension for an addressable portion of the second reference.

14. One or more non-transitory machine-readable media storing instructions which, when executed by one or more processors, cause:
  identifying a request, by an application thread, to write a first reference onto a heap memory;
  determining a first garbage collection state, of a plurality of garbage collection states, associated with a current phase of a garbage collection cycle performed by a garbage collection thread;
  wherein the first reference does not include any indication of any of the plurality of garbage collection states;
  generating a second reference from the first reference at least by adding an indication of the first garbage collection state;
  storing the second reference onto the heap memory.

15. The one or more media of claim 14, wherein the first garbage collection state is associated with references for which a set of garbage collection operations associated with the current phase of the garbage collection cycle is completed.

16. The one or more media of claim 14, wherein a respective garbage collection state, of the plurality of garbage collection states, indicates a progress of garbage collection operations with respect to each of a plurality of references stored in the heap memory.

17. The one or more media of claim 14, wherein the first reference to be written onto the heap memory is stored on a call stack of the application thread.

18. The one or more media of claim 14, further storing instructions which cause:
  identifying, by the garbage collection thread, the second reference;
  based on the first garbage collection state associated with the first reference: selecting a path, from a plurality of paths, to be executed with respect to the second reference;
  wherein at least one path of the plurality of paths comprises updating the first reference to indicate that a second garbage collection state, of the plurality of garbage collection states, is associated with the second reference.

19. The one or more media of claim 14, wherein the first garbage collection state is a good garbage collection state during the current phase of the garbage collection cycle performed by the garbage collection thread.

20. The one or more media of claim 14, wherein the first reference complies with canonical form, and the second reference does not comply with the canonical form.

21. One or more non-transitory machine-readable media storing instructions which, when executed by one or more processors, cause:
  identifying a compiled method that is stored in a memory location;
  determining that metadata associated with the compiled method indicates that a first garbage collection state, of a plurality of garbage collection states, is associated with the compiled method;
  wherein a respective garbage collection state, of the plurality of garbage collection states, indicates a progress of garbage collector operations with respect to each of a plurality of references stored in a heap memory;
  based on the first garbage collection state associated with the compiled method: selecting a path, from a plurality of paths, to be executed with respect to each of a plurality of references embedded in the compiled method.

22. The one or more media of claim 21, wherein at least the identifying operation and the determining operation are performed by one of an application thread or a garbage collection thread.

23. The one or more media of claim 21, further storing instructions which cause:
  executing the selected path with respect to each of the plurality of references.

24. The one or more media of claim 21, wherein executing the selected path with respect to each of the plurality of references comprises:
  completing a set of garbage collection operations, associated with the current phase of the garbage collection cycle, with respect to each of the plurality of references.

25. The one or more media of claim 21, further storing instructions which cause:
  updating the metadata associated with the compiled method to indicate that a second garbage collection state, of the plurality of garbage collection states, is associated with the compiled method.

26. The one or more media of claim 21, further storing instructions which cause:
  at least one of loading and executing the compiled method.

27. The one or more media of claim 21, further storing instructions which cause:
  updating the metadata associated with the compiled method to indicate that a second garbage collection state, of the plurality of garbage collection states, is associated with the compiled method;
  executing the compiled method;
  subsequent to executing the compiled method:
    based on the second garbage collection state associated with the compiled method:
      selecting another path, from the plurality of paths, to be executed with respect to each of the plurality of references embedded in the compiled method.

28. The one or more media of claim 21, wherein the plurality of references embedded in the compiled method do not indicate any garbage collection state, of the plurality of garbage collection states, associated with the plurality of references.

29. The one or more media of claim 21, wherein the garbage collection thread performs garbage collection on the plurality of references embedded in the compiled method based on a current garbage collection state, of the plurality of garbage collection states, that is associated with the compiled method.

30. The one or more media of claim 21, wherein the application thread performs garbage collection on the plurality of references embedded in the compiled method based on a current garbage collection state, of the plurality of garbage collection states, that is associated with the compiled method.

31. The one or more media of claim 21, wherein the compiled method and the metadata associated with the compiled method are stored in a code cache.

* * * * *